United States Patent
Kim et al.

(10) Patent No.: US 10,292,144 B2
(45) Date of Patent: May 14, 2019

(54) METHOD FOR TRANSMITTING AND RECEIVING SIGNAL IN WIRELESS COMMUNICATION SYSTEM AND DEVICE THEREFOR

(71) Applicant: LG ELECTRONICS INC., Seoul (KR)

(72) Inventors: Hakseong Kim, Seoul (KR); Hanbyul Seo, Seoul (KR)

(73) Assignees: LG Electronics Inc., Seoul (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 15/109,033

(22) PCT Filed: Mar. 19, 2015

(86) PCT No.: PCT/KR2015/002651
§ 371 (c)(1),
(2) Date: Jun. 29, 2016

(87) PCT Pub. No.: WO2015/142066
PCT Pub. Date: Sep. 24, 2015

(65) Prior Publication Data
US 2016/0381666 A1  Dec. 29, 2016

Related U.S. Application Data

(60) Provisional application No. 61/968,347, filed on Mar. 20, 2014, provisional application No. 61/969,251, (Continued)

(51) Int. Cl.
*H04W 72/04* (2009.01)
*H04B 7/26* (2006.01)
(Continued)

(52) U.S. Cl.
CPC ............ *H04W 72/042* (2013.01); *H04B 7/26* (2013.01); *H04L 1/0003* (2013.01);
(Continued)

(58) Field of Classification Search
None
See application file for complete search history.

(56) References Cited

U.S. PATENT DOCUMENTS

2013/0322413 A1* 12/2013 Pelletier ............ H04W 72/1289
370/336
2014/0177540 A1*  6/2014 Novak ................ H04W 72/042
370/329
(Continued)

FOREIGN PATENT DOCUMENTS

CN        102546700 A    7/2012
WO     2012159270 A1   11/2012
(Continued)

OTHER PUBLICATIONS

U.S. Appl. No. 61/915,875, Novlan, "Device-To-Device Broadcast Communications System Protocol".*
(Continued)

*Primary Examiner* — Kwang B Yao
*Assistant Examiner* — Juvena W Loo
(74) *Attorney, Agent, or Firm* — Dentons US LLP

(57) ABSTRACT

The present invention relates to a method for transmitting and receiving data in a wireless communication system supporting device to device (D2D) communication. The method performed by first User Equipment (UE) includes receiving first control information related to D2D communication from an eNB, transmitting second control information, including resource information related to D2D data transmission, to second UE based on the received first control information, and transmitting the D2D data to the
(Continued)

second UE. Receiving the first control information includes allocating, by the eNB, a resource pool related to the D2D communication through high layer signaling.

6 Claims, 37 Drawing Sheets

Related U.S. Application Data filed on Mar. 23, 2014, provisional application No. 61/969,822, filed on Mar. 24, 2014.

(51) Int. Cl.

| | | |
|---|---|---|
| *H04W 52/02* | (2009.01) | |
| *H04L 1/00* | (2006.01) | |
| *H04L 5/00* | (2006.01) | |
| *H04W 76/14* | (2018.01) | |
| *H04W 92/18* | (2009.01) | |

(52) U.S. Cl.
CPC ....... *H04L 5/0055* (2013.01); *H04W 52/0216* (2013.01); *H04W 52/0219* (2013.01); *H04W 72/0446* (2013.01); *H04W 76/14* (2018.02); *H04W 92/18* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/164* (2018.01); *Y02D 70/21* (2018.01); *Y02D 70/23* (2018.01); *Y02D 70/24* (2018.01); *Y02D 70/25* (2018.01); *Y02D 70/449* (2018.01)

(56) References Cited

U.S. PATENT DOCUMENTS

| | | | | |
|---|---|---|---|---|
| 2014/0321423 A1* | 10/2014 | Kalhan | ............. | H04W 72/0493 370/330 |
| 2014/0328329 A1* | 11/2014 | Novlan | ............... | H04W 72/042 370/336 |
| 2015/0092710 A1* | 4/2015 | Novlan | ............. | H04W 72/1278 370/329 |
| 2015/0131571 A1* | 5/2015 | Fodor | .................. | H04W 4/005 370/329 |
| 2015/0133102 A1* | 5/2015 | Sorrentino | ............ | H04W 8/005 455/418 |
| 2015/0156619 A1* | 6/2015 | Fodor | .................. | H04W 8/005 455/434 |
| 2015/0223257 A1* | 8/2015 | Wilhelmsson | ...... | H04W 76/023 455/452.1 |
| 2015/0264677 A1* | 9/2015 | He | ....................... | H04W 72/02 370/312 |
| 2016/0014589 A1* | 1/2016 | Niu | ....................... | H04W 74/02 370/329 |
| 2016/0081073 A1* | 3/2016 | Lindoff | ............. | H04W 72/1257 370/329 |
| 2016/0337097 A1* | 11/2016 | Martin | .................. | H04W 76/14 |

FOREIGN PATENT DOCUMENTS

| | | |
|---|---|---|
| WO | 2013074462 A1 | 5/2013 |
| WO | 2013107277 A1 | 7/2013 |

OTHER PUBLICATIONS

LG Electronics, "Discussion on D2D Communication Scheduling Method," R1-135483, 3GPP TSG RAN WG1 Meeting #75, Nov. 15, 2013, see pp. 1-3, and figure 1.
ZTE, "Study on D2D Resource Allocation for OUt of Network Coverage Scenario," R1-140271, 3GPP TSG RAN WG1 #76, Feb. 14, 2014, see pp. 1, 3.
Ericsson, "On Scheduling for D2D Communication," R1-135808, 3GPP TSG RAN WG1 Meeting #75, Nov. 15, 2013, see pp. 2, 3.
Ericsson, "On Scheduling procedure for D2D," R1-140778, 3GPP TSG RAN WG1 Meeting #76, Feb. 14, 2014, see pp. 1-4.
Intel Corporation, "Discussion on D2D Resource Allocation Method," R1-135115, 3GPP TSG RAN WG1 Meeting #75, Nov. 15, 2013, see pp. 2, 3.
MCC Support: "Draft Report of 3GPP TSG RAN WG1 #76 v.0.2.0 (Prague, Czech Republic, Feb. 10-14, 2014)", 3GPP TSG RAN WG1 Meeting #76bis, Shenzhen, China, Mar. 31-Apr. 4, 2014.
ZTE: "Physical channel design for D2D communication", R1-140270, 3GPP TSG RAN WG1 Meeting #76, Prague, Czech Republic, Feb. 10-14, 2014.
Intel Corporation: "Discussion on D2D Opeartion within Network Coverage (Mode-1)", R1-141164, 3GPP TSG RAN WG1 Meeting #76bis, Shenzhen, China, Mar. 31-Apr. 4, 2014.
R1-140388: 3GPP TSG RAN WG1 #76; Prague, Czech Republic, Feb. 10-14, 2014; Samsung, "Physical channel design for D2D communication," pp. 1-4.
R1-140771, 3GPP TSG RAN WG1 Meeting #76, Prague, Czech Republic, Feb. 10-14, 2014, Ericcson, "Overview of D2D functions and standardization impact," pp. 1-8.
R2-140693: 3GPP TSG-RAN WG2 Meeting #85, Prague, Czech Republic, Feb. 10-14, 2014, ZTE, "Resource allocation for D2D communication," pp. 1-6.
R1-140271, 3GPP TSG-RAN WG1 #76, Prague, Czech Republic, Feb. 10-14, 2014, ZTE, "Study on D2D Resource Allocation for Out of Network Coverage Scenario" pp. 1-10.
R2-140312: 3GPP TSG-RAN WG2, Meeting #85, Prague, Czech Republic, Feb. 10-14, 2014, Intel Corporation, "Resource allocation for D2D communication," pp. 1-5.
R1-140776: 3GPP TSG RAN WG1 Meeting #76, Prague, Czech Republic, Feb. 10-14, 2014, Ericsson, "D2D Physical Channels Design," pp. 1-10.
International Search Report from PCT/KR2015/002651, dated Jun. 17, 2015.

\* cited by examiner

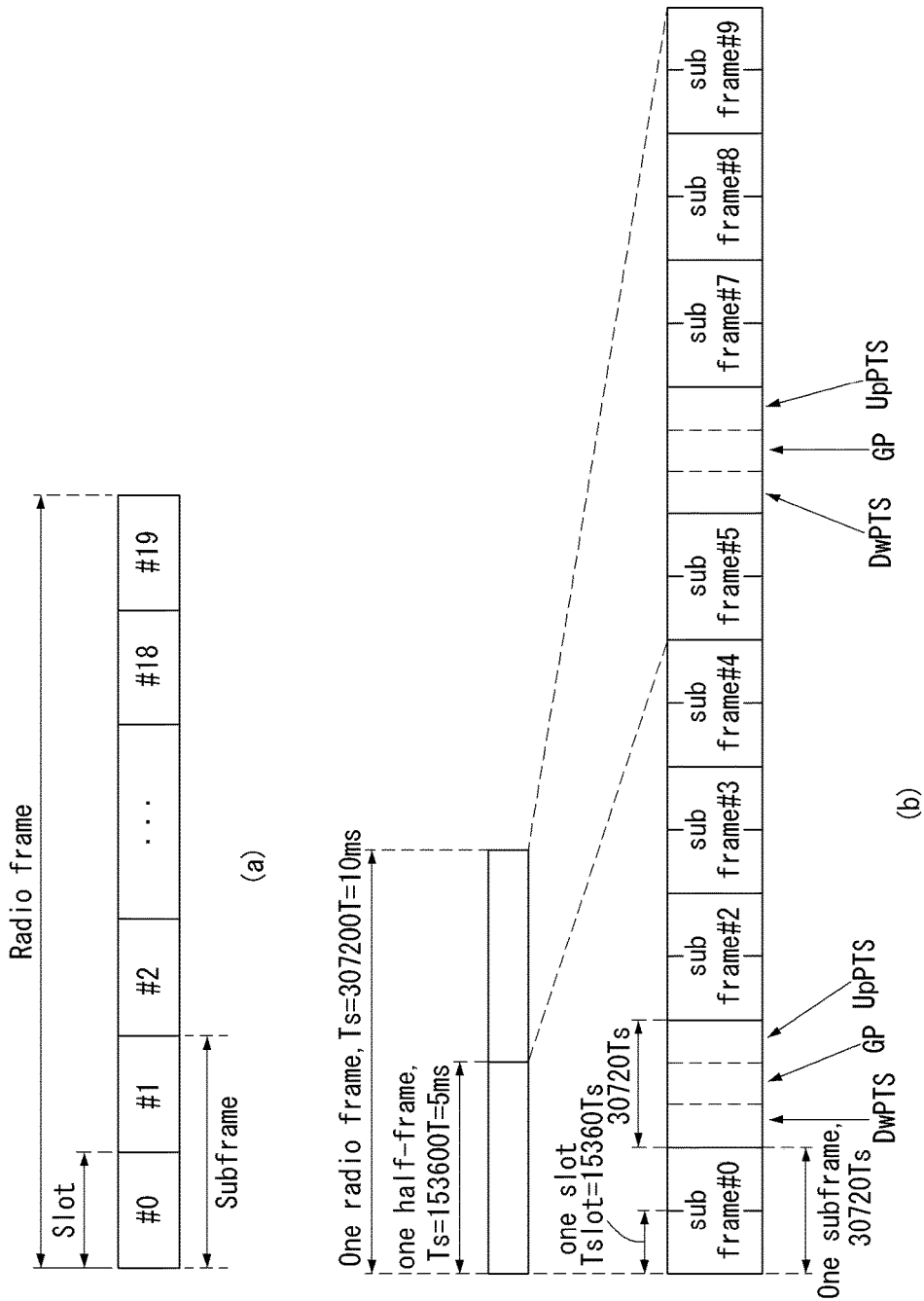

[Figure 2]
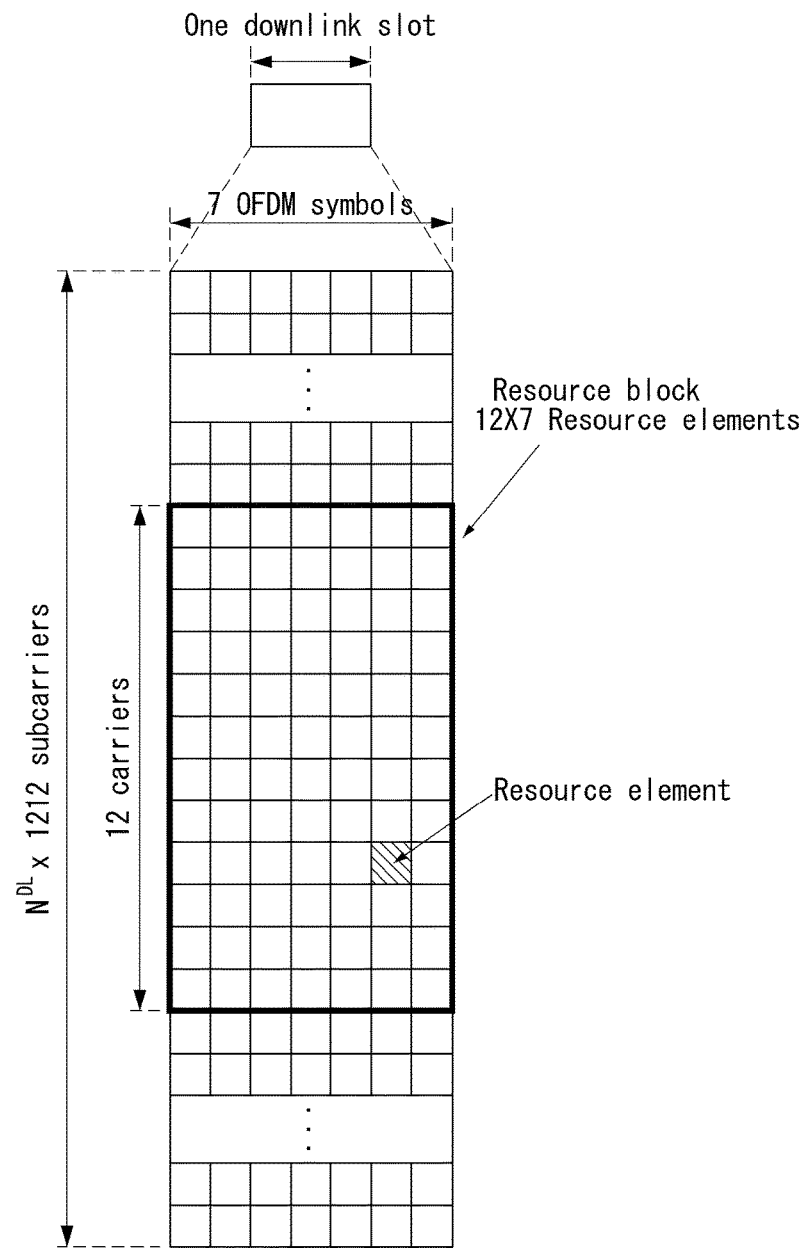

[Figure 3]
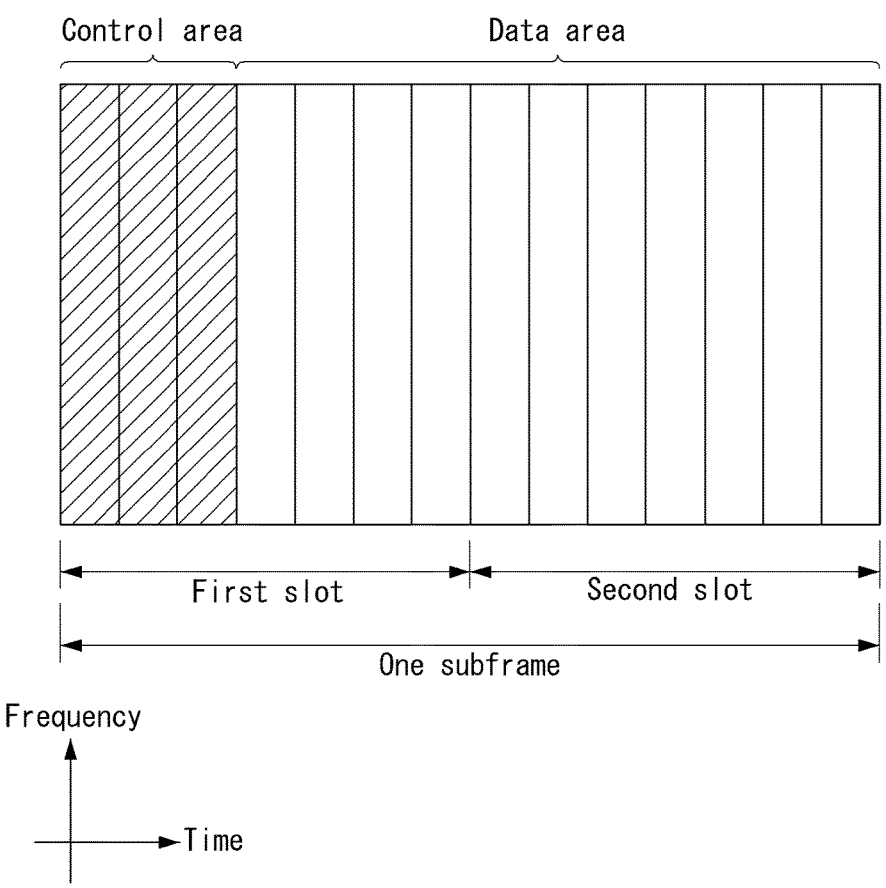

[Figure 4]
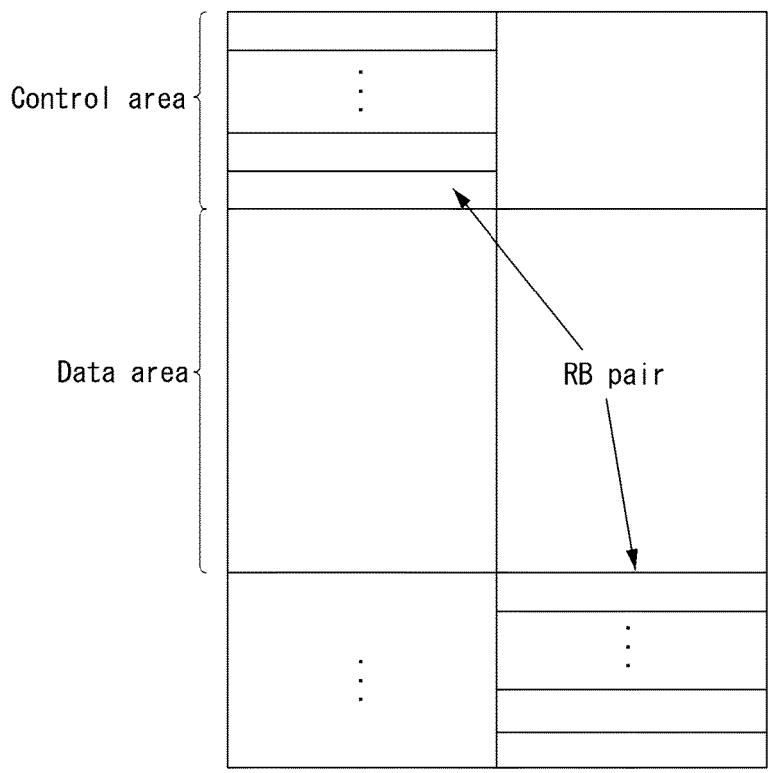
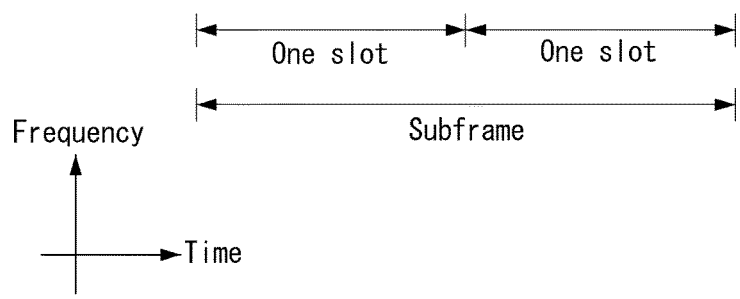

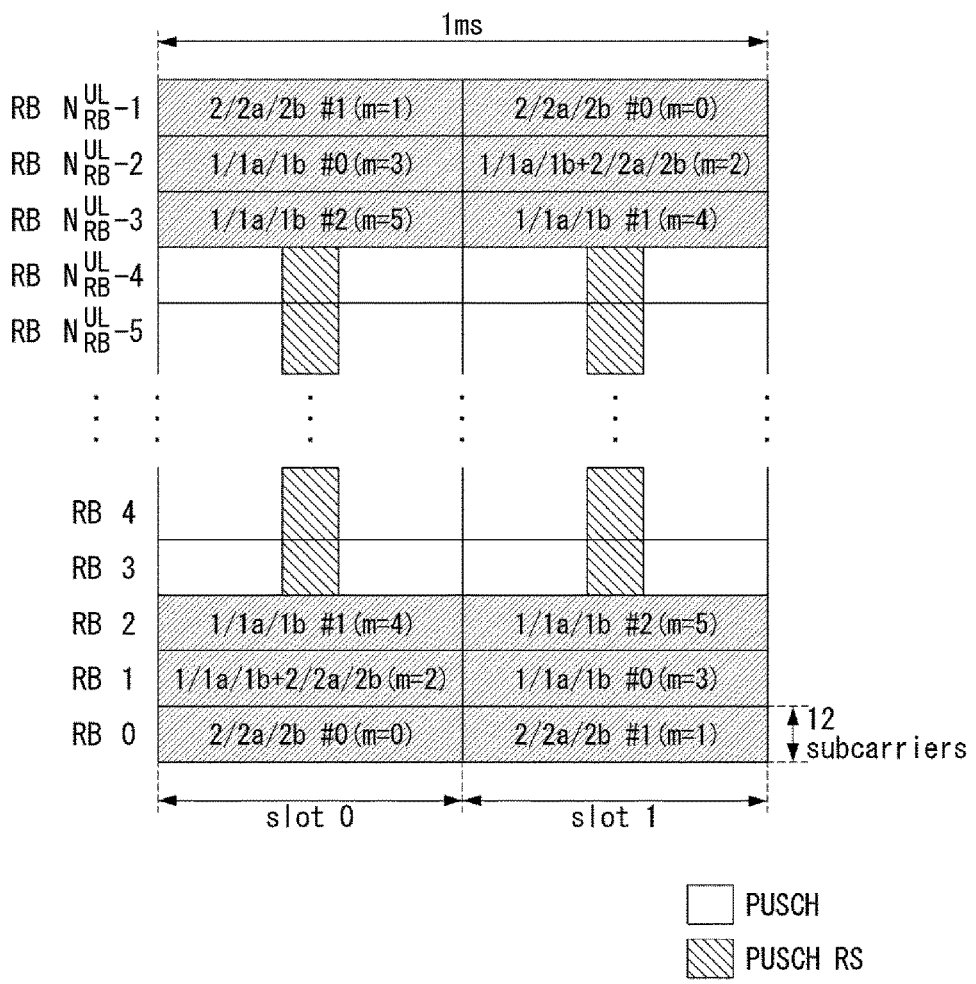
[Figure 5]

[FIGURE 6]
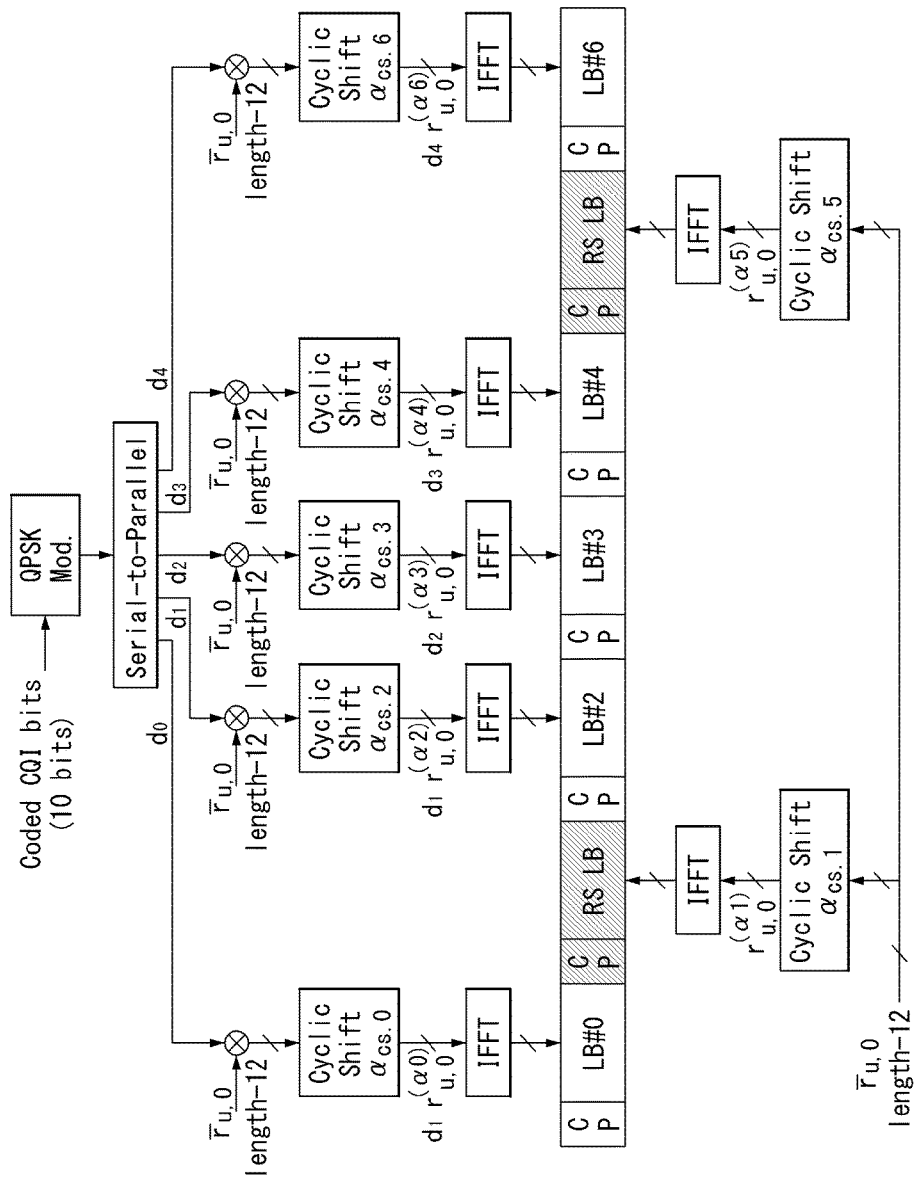

[Figure 7]
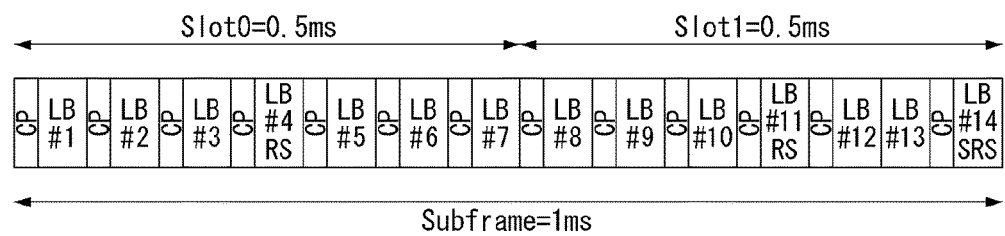

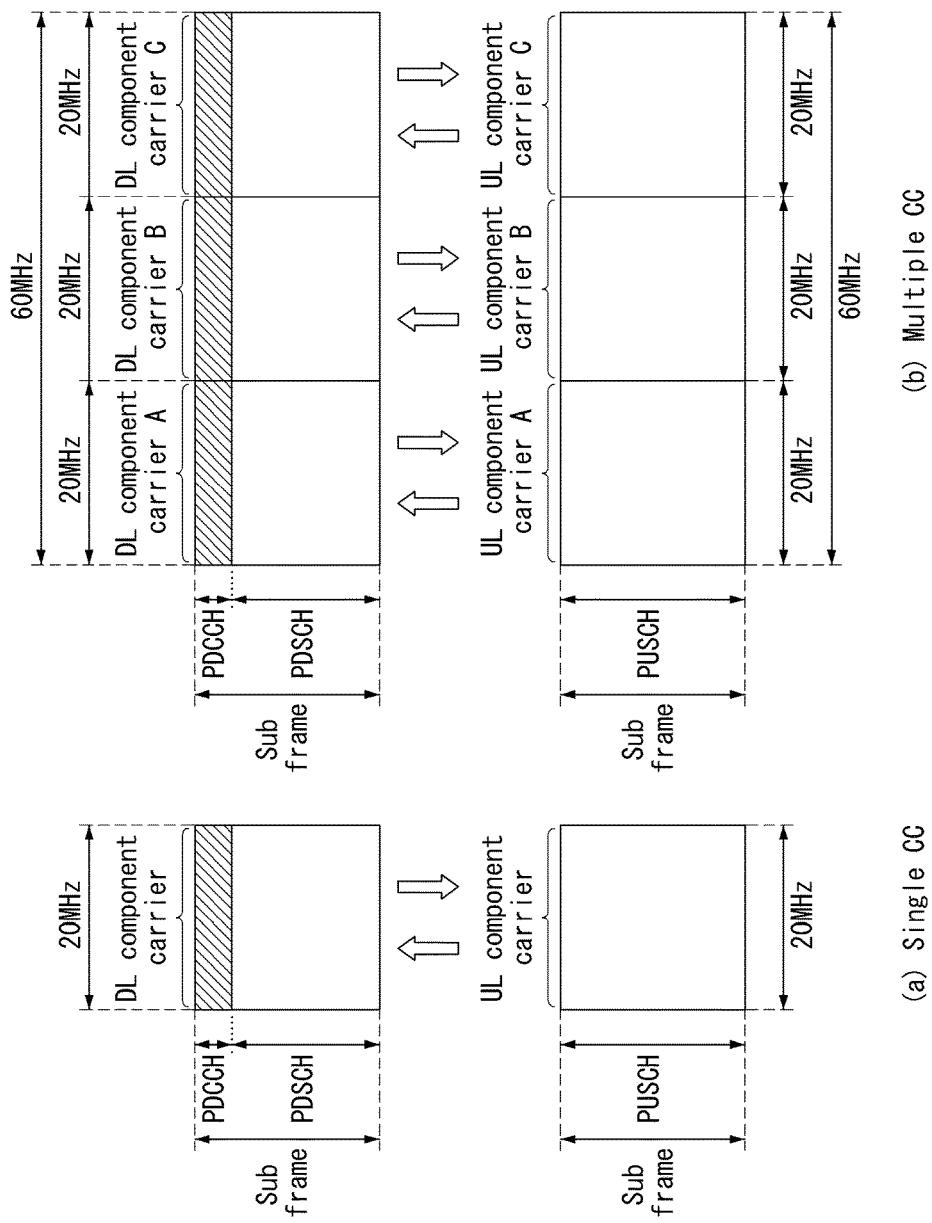

[Figure 9]
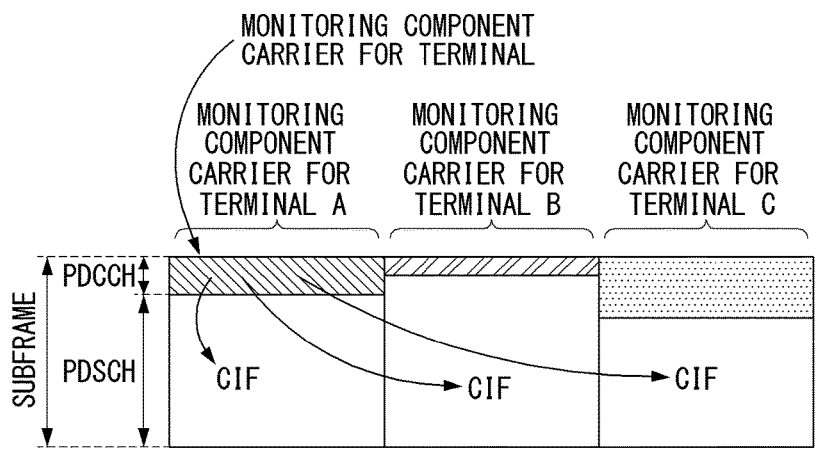
[Figure 10]
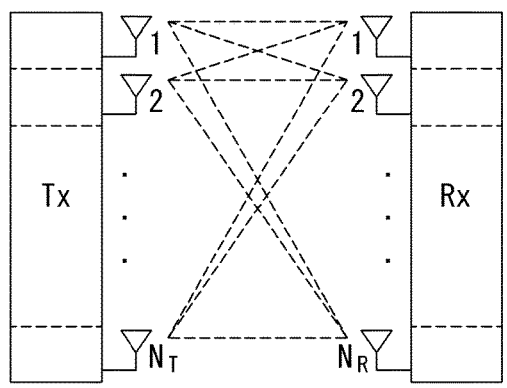

[Figure 11]
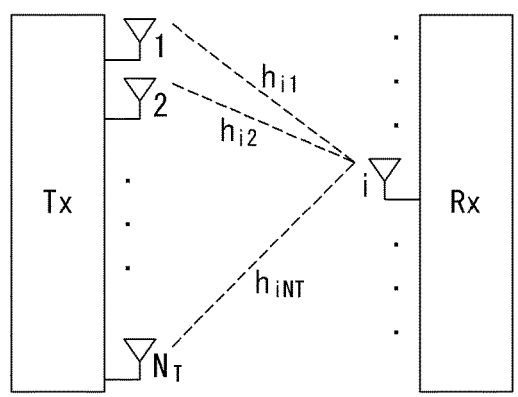
[Figure 12]
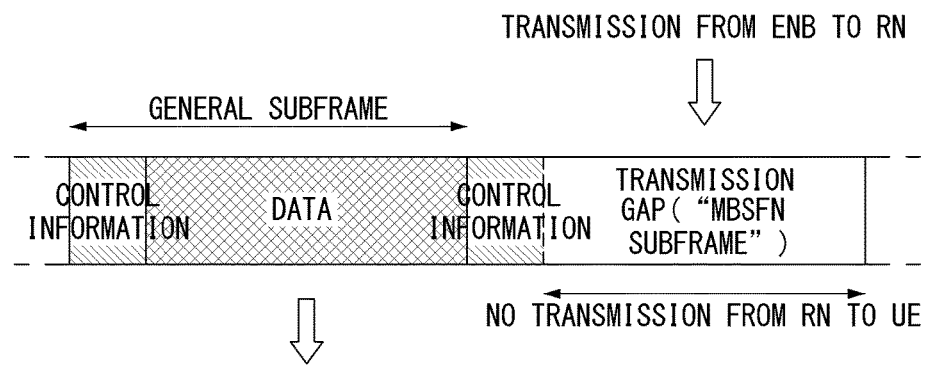

[Figure 13]
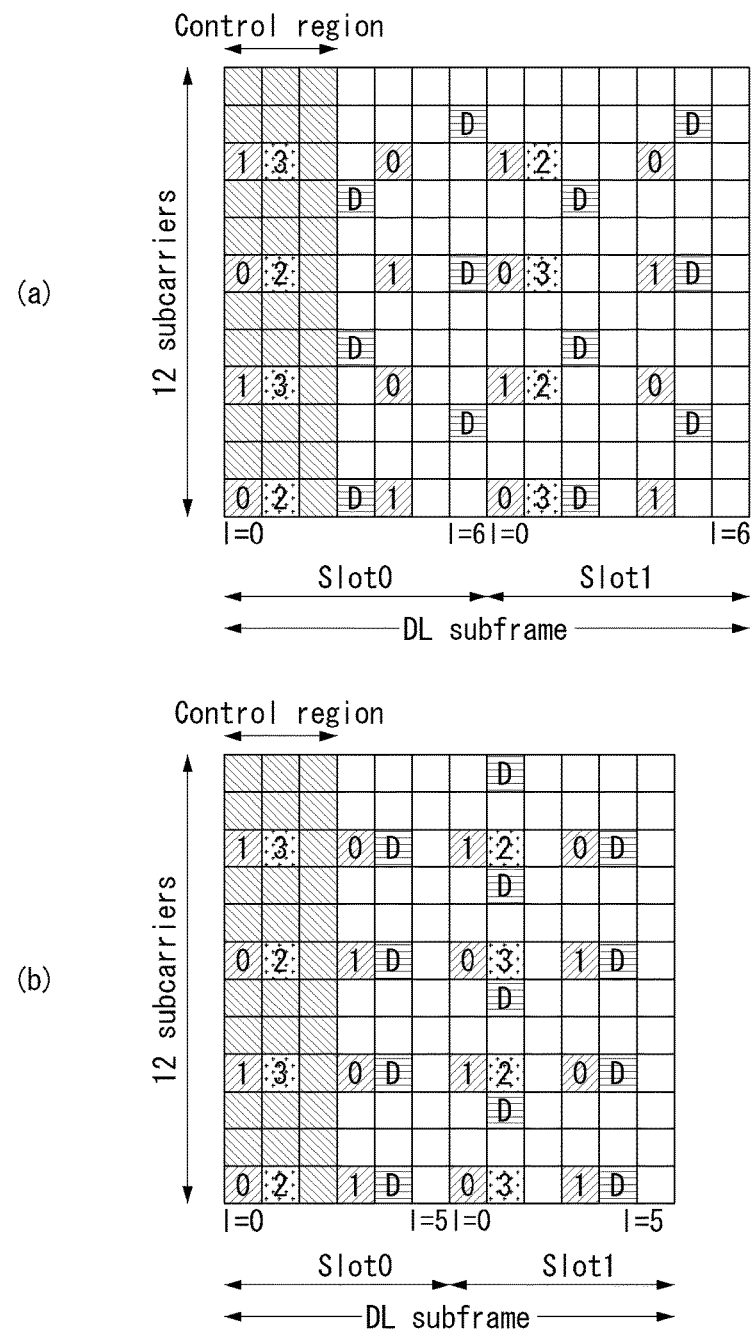

[Figure 14]
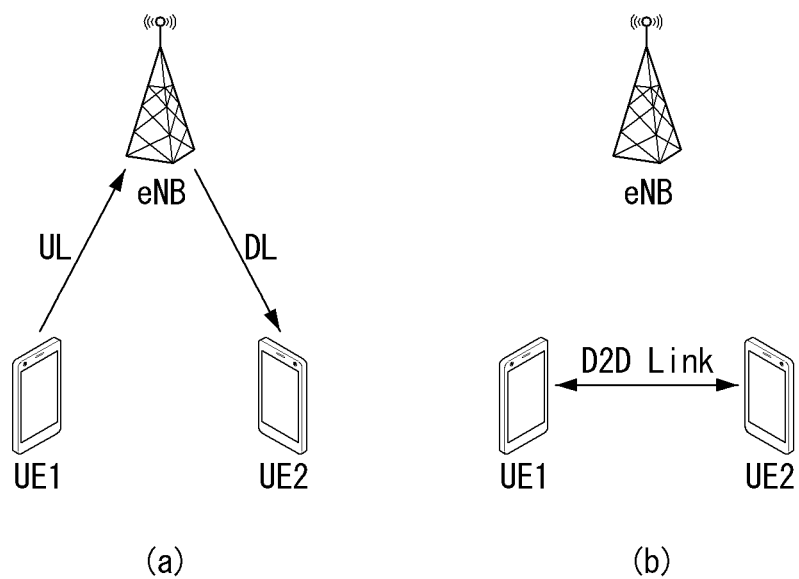
(a)  (b)

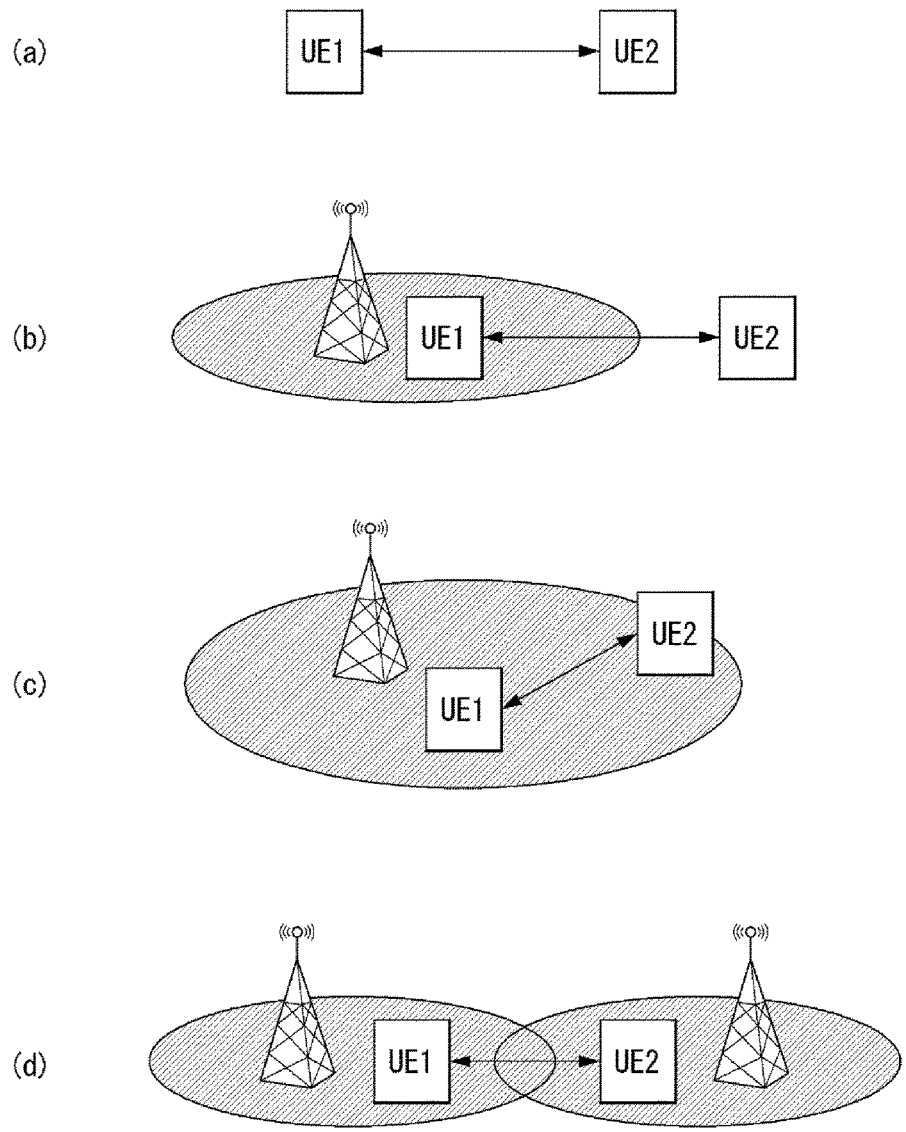
[Figure 15]

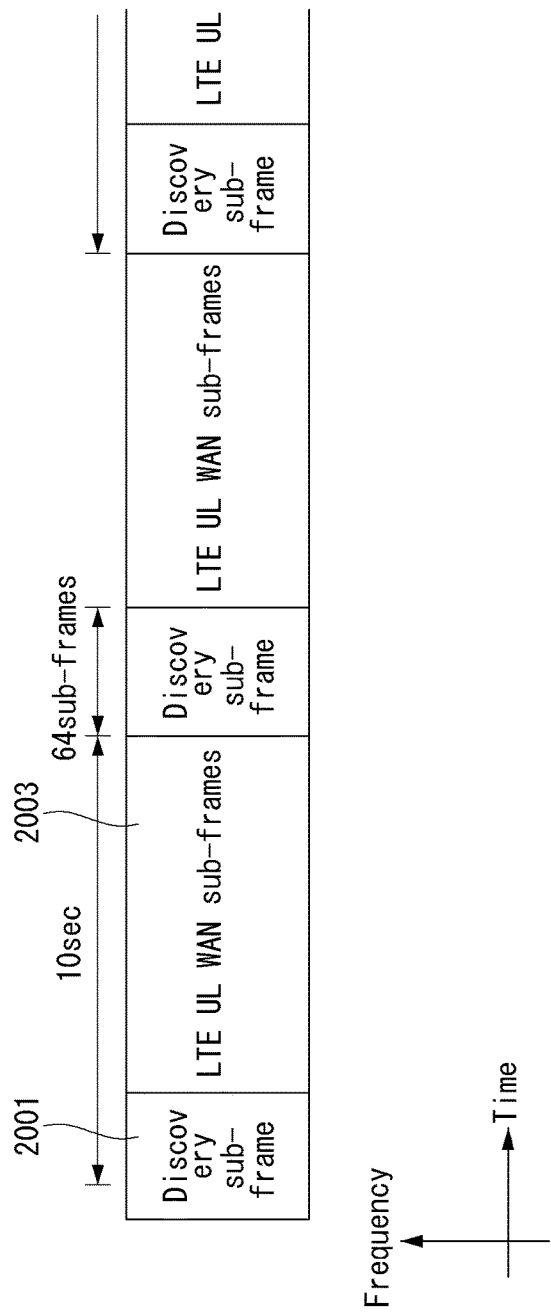

[Figure 17]
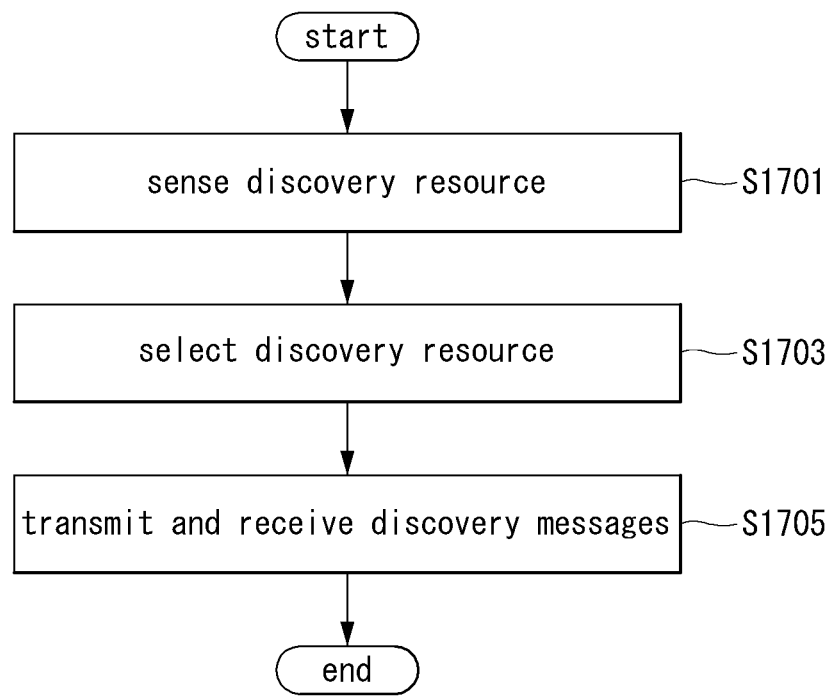

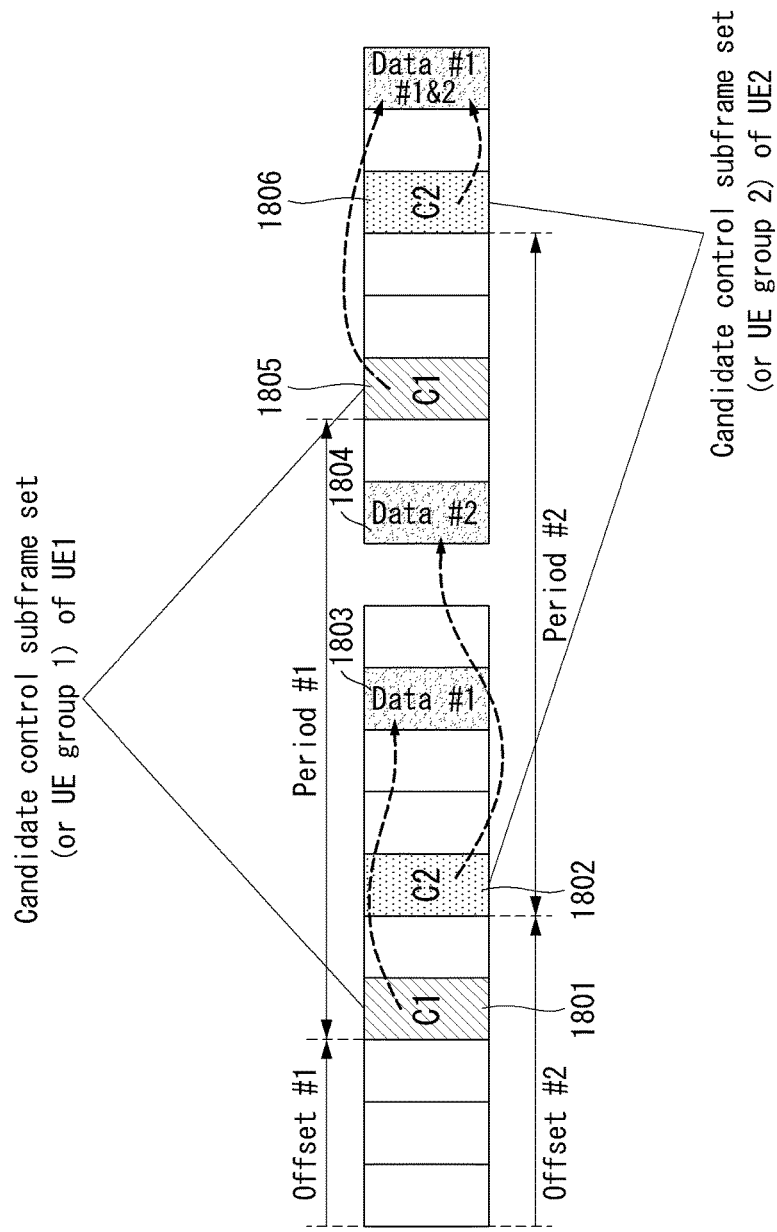
[Figure 18]

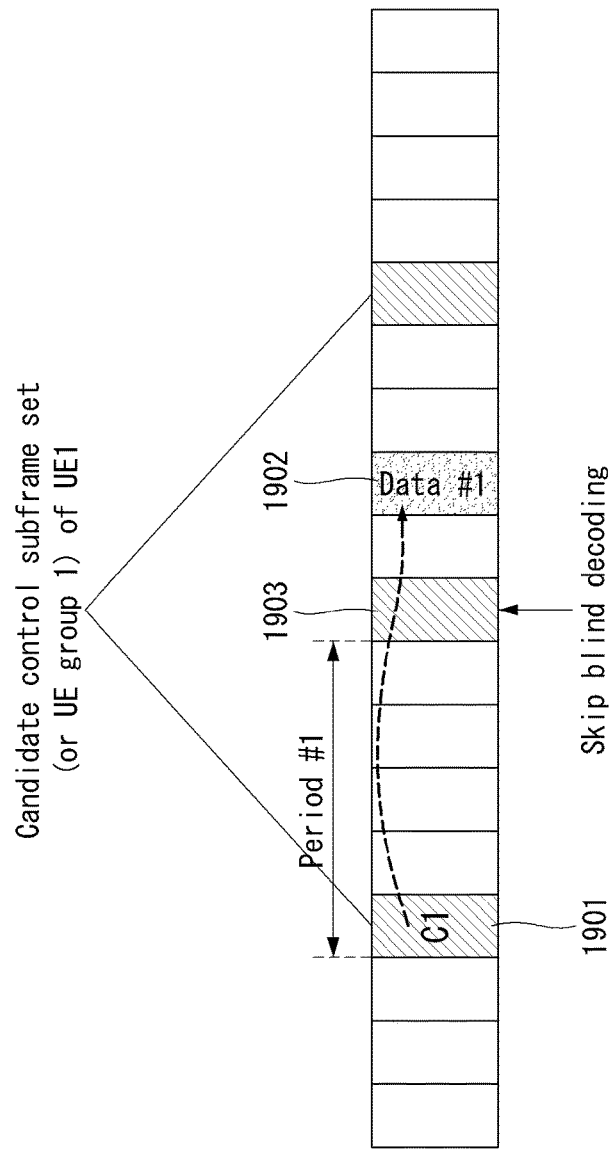

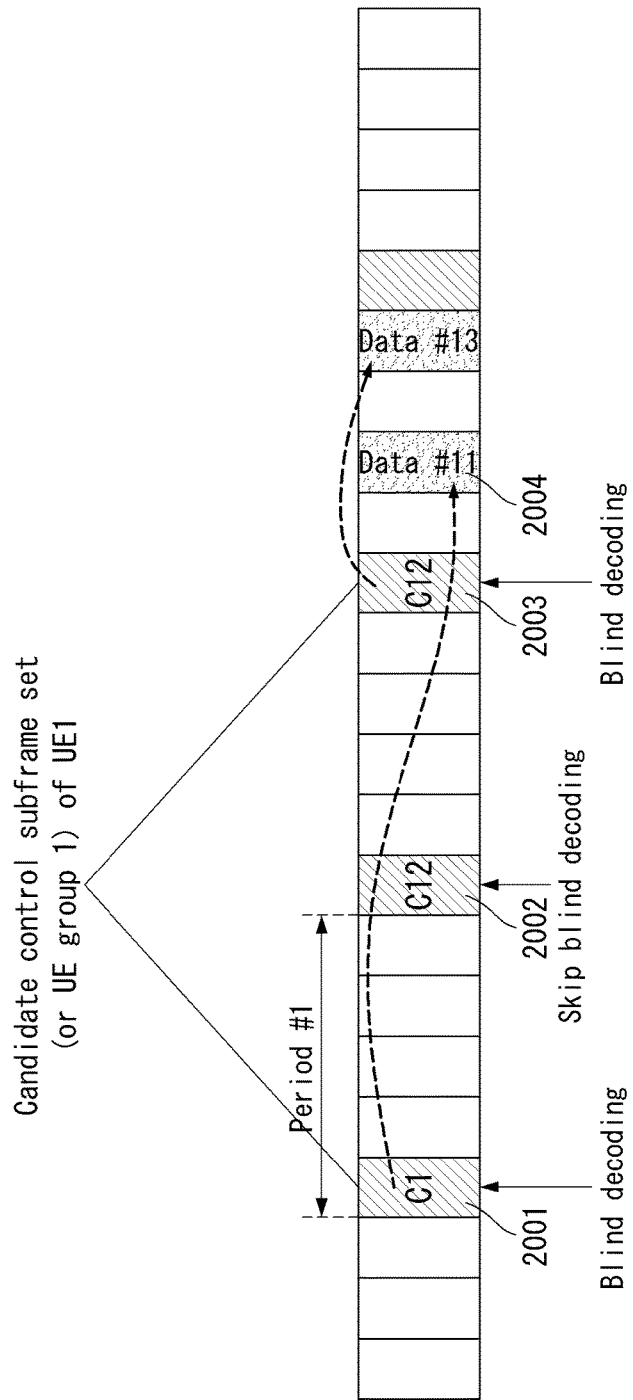
[Figure 20]

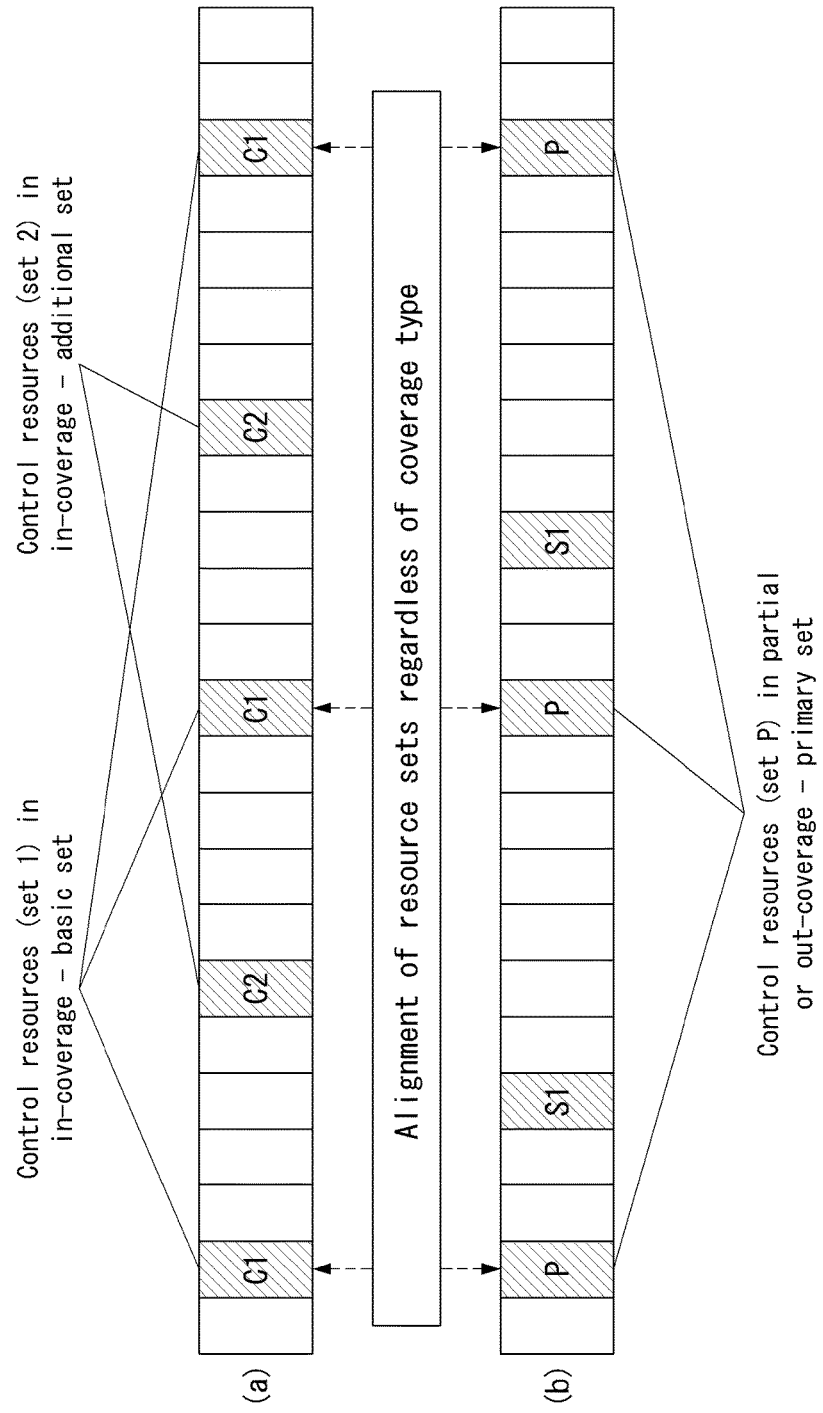
[Figure 21]

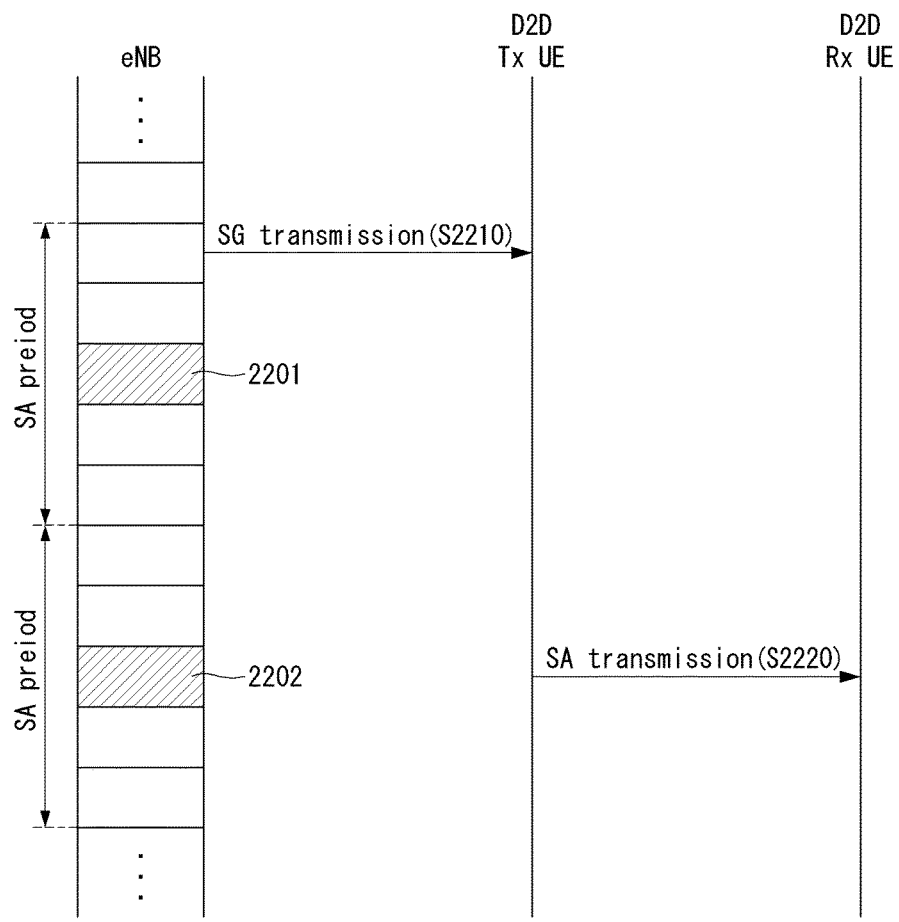
[Figure 22]

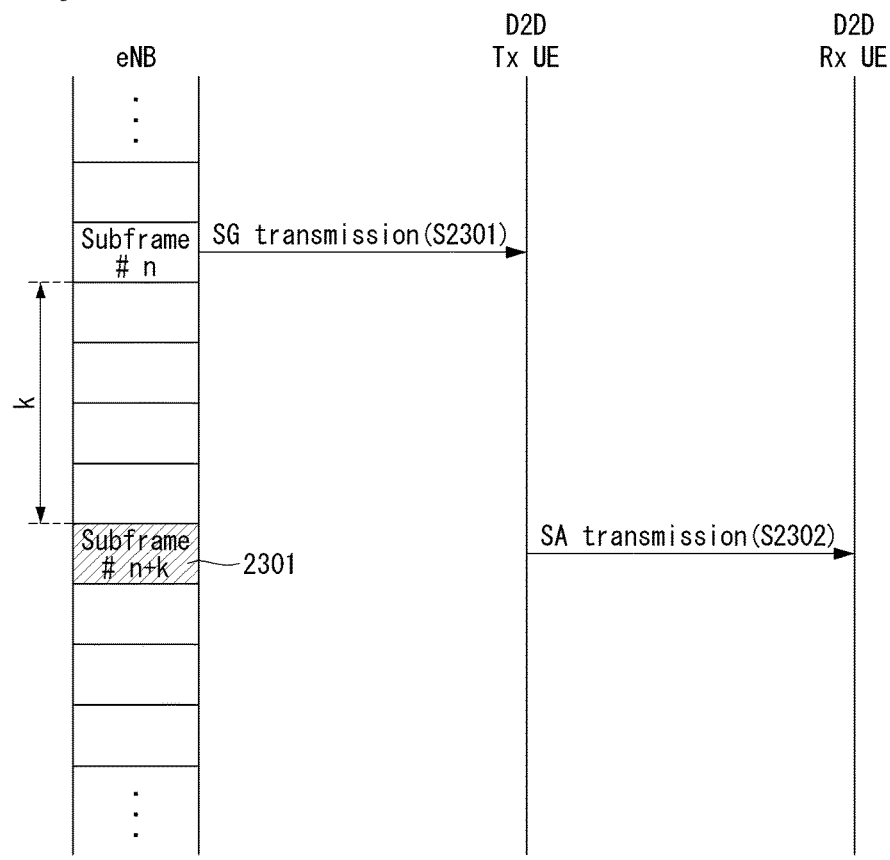
[Figure 23a]

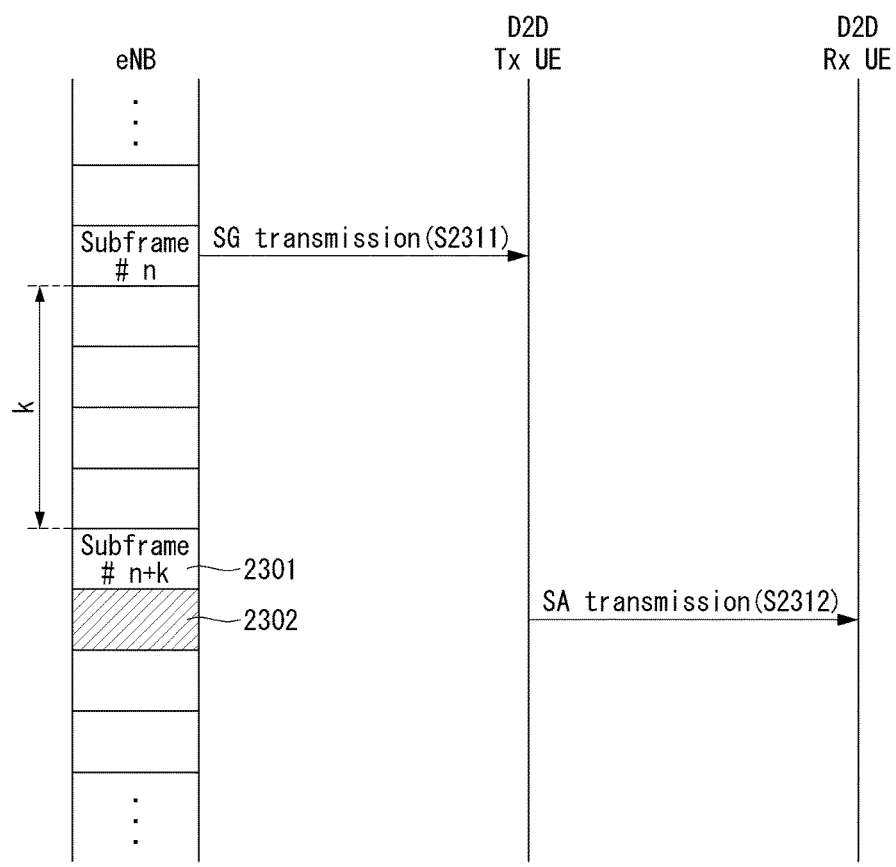
[Figure 23b]

[Figure 24]
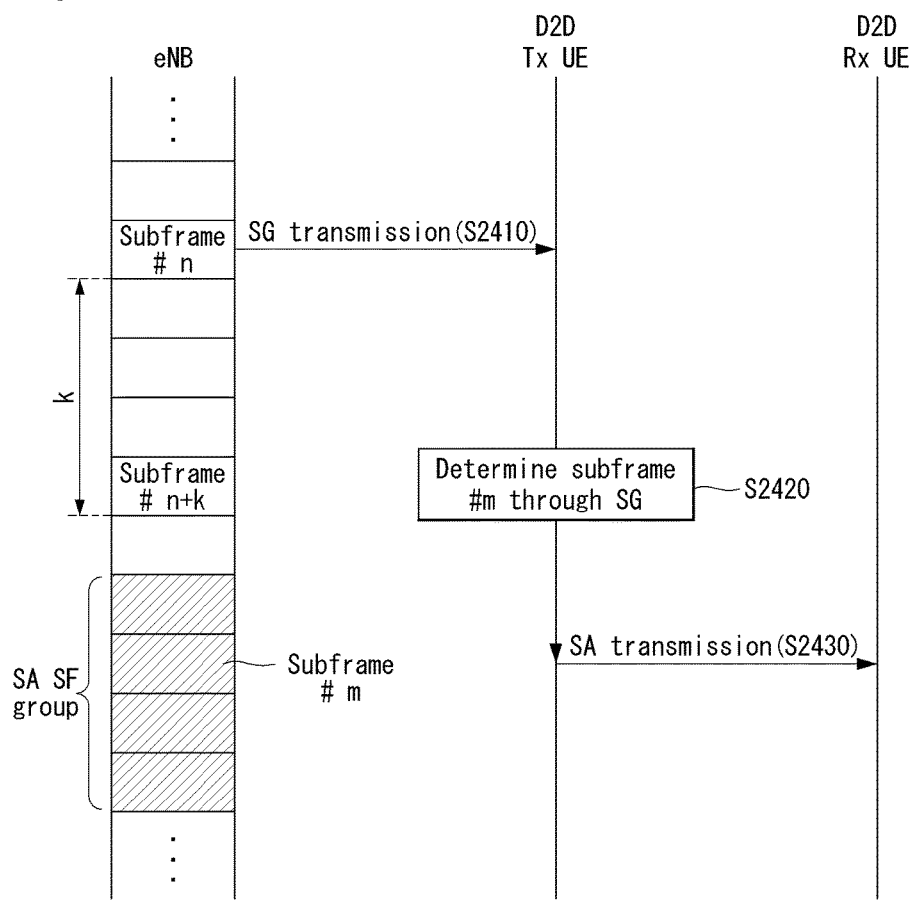

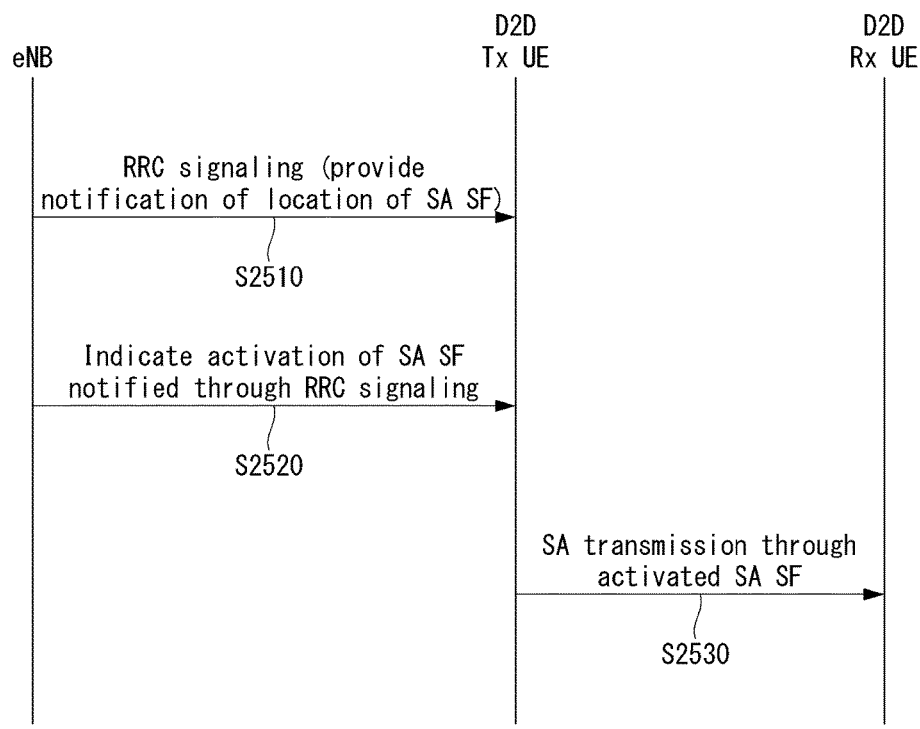
[Figure 25]

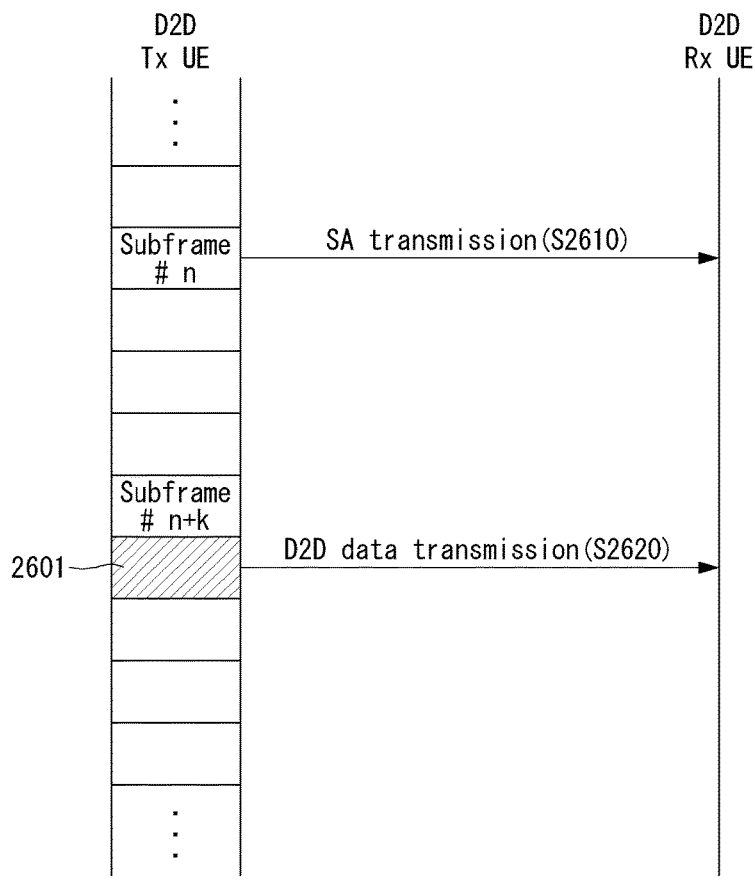
[Figure 26]

[Figure 27]
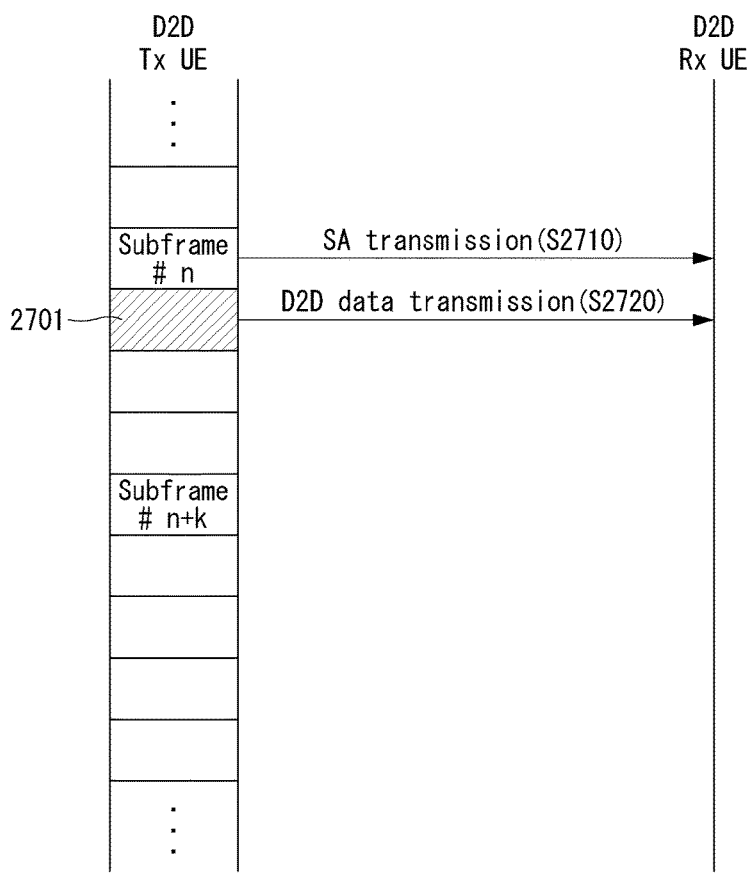

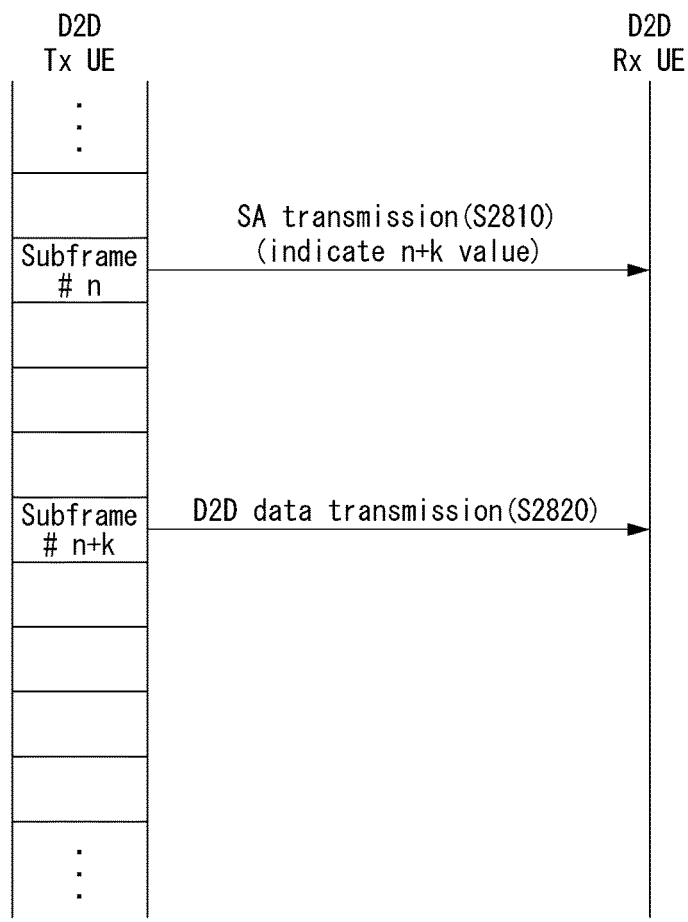
[Figure 28]

[Figure 29]
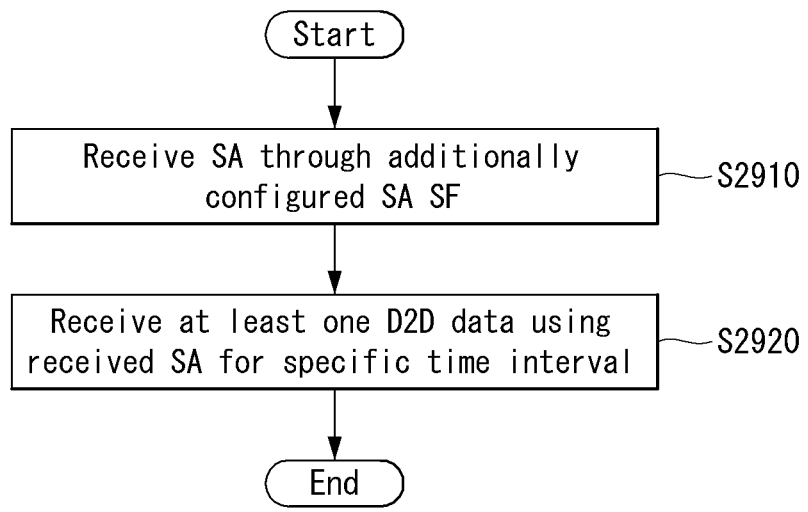

[Figure 30]
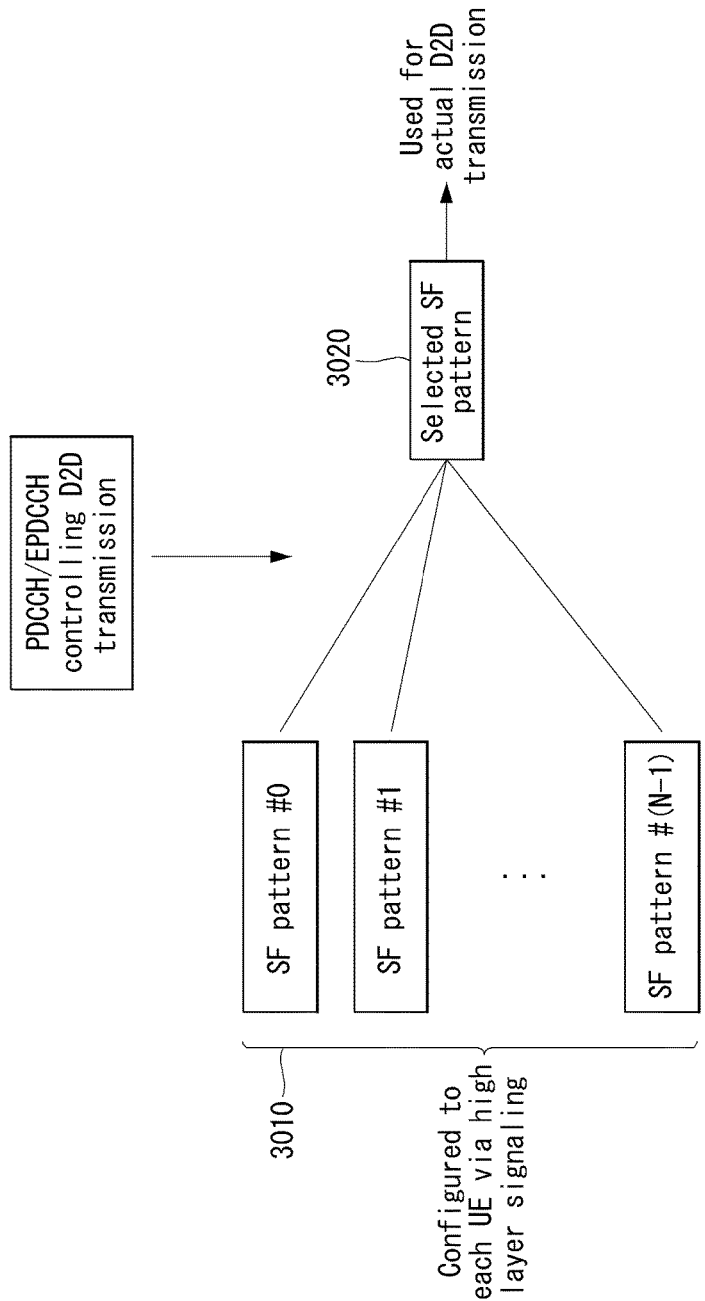

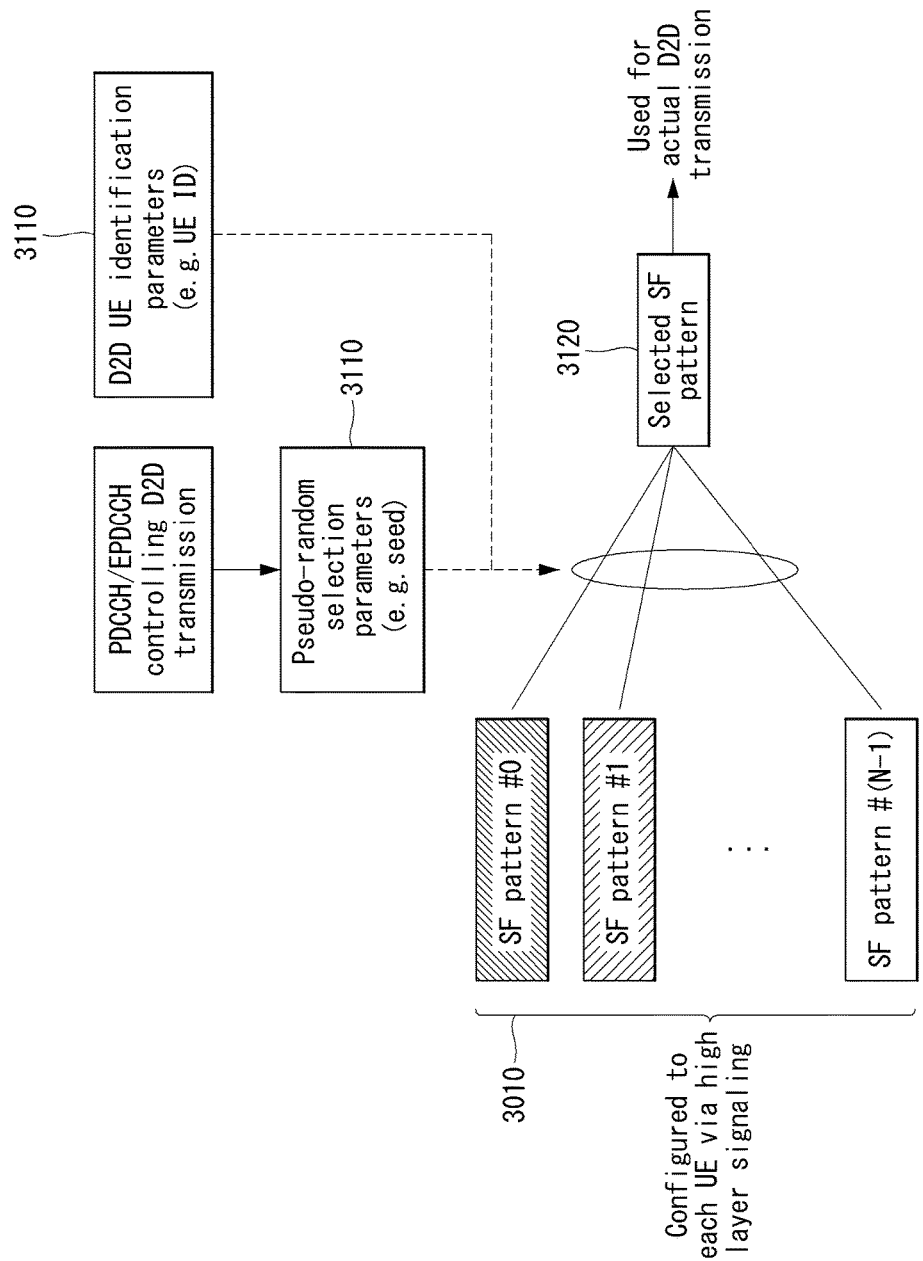

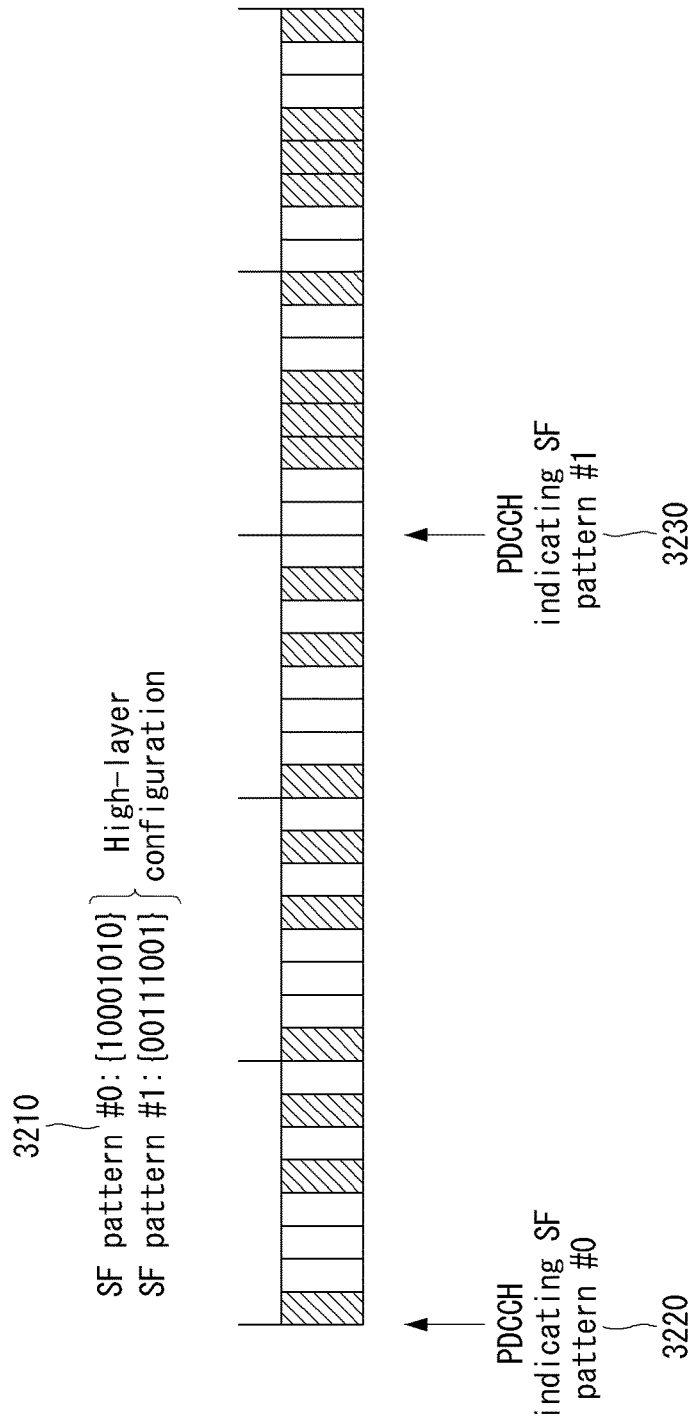

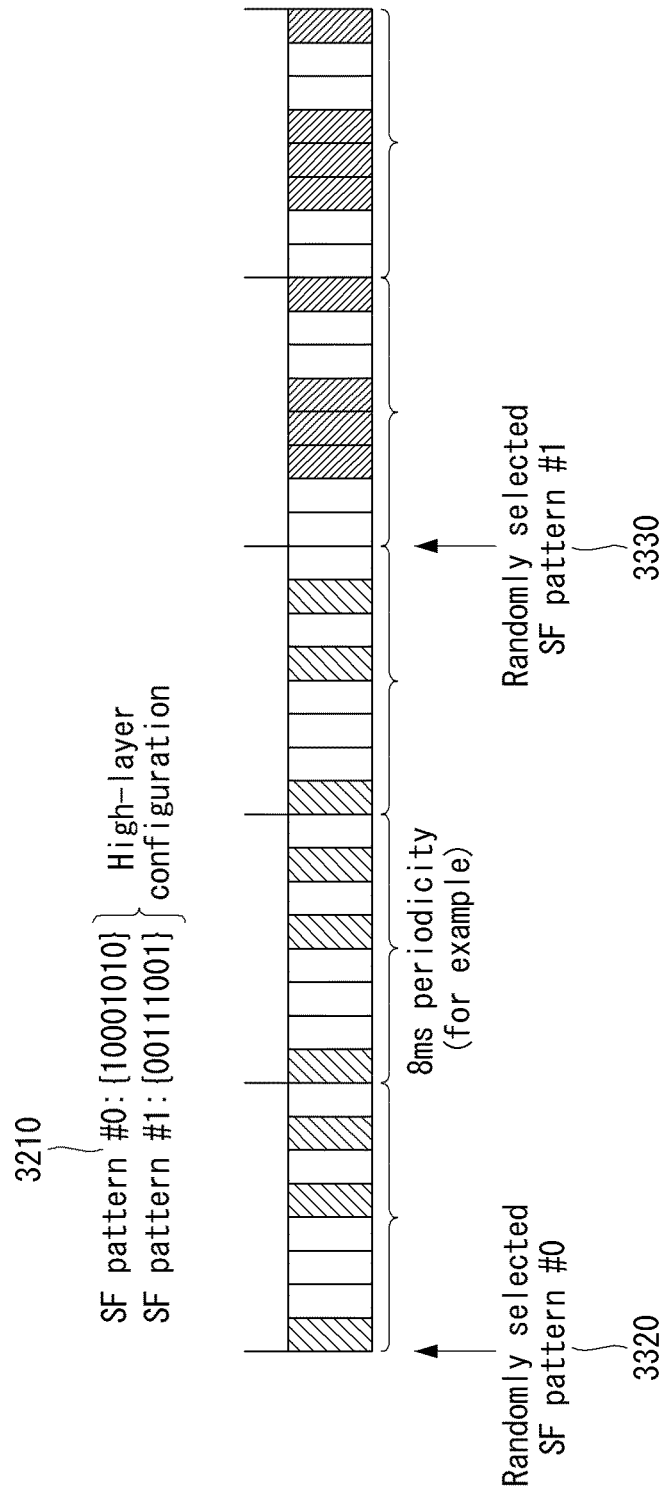

[Figure 34]
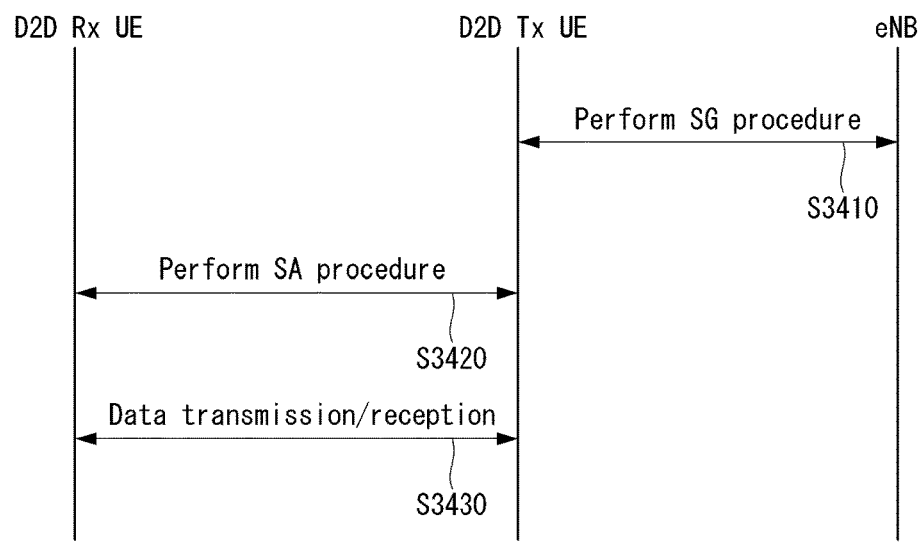

[Figure 35]
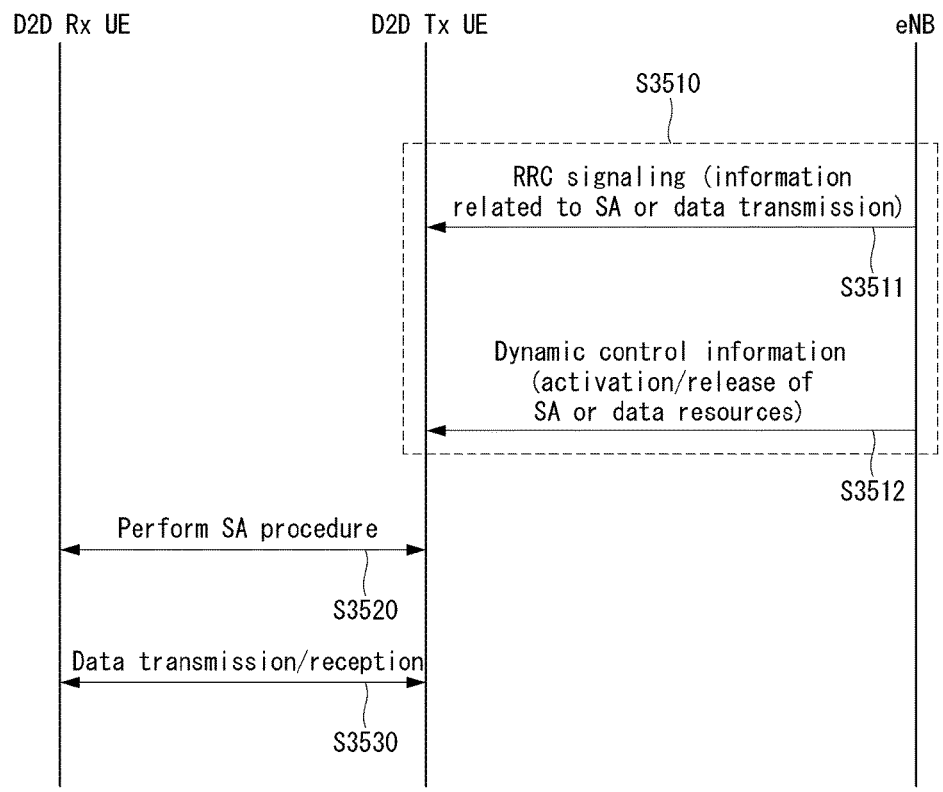

[Figure 36]
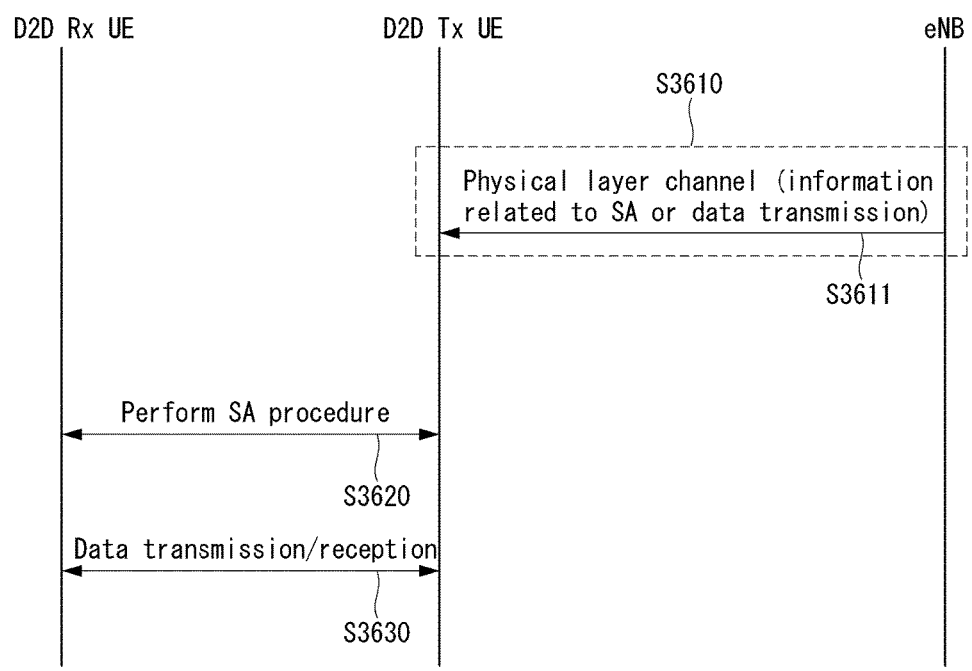

[Figure 37]
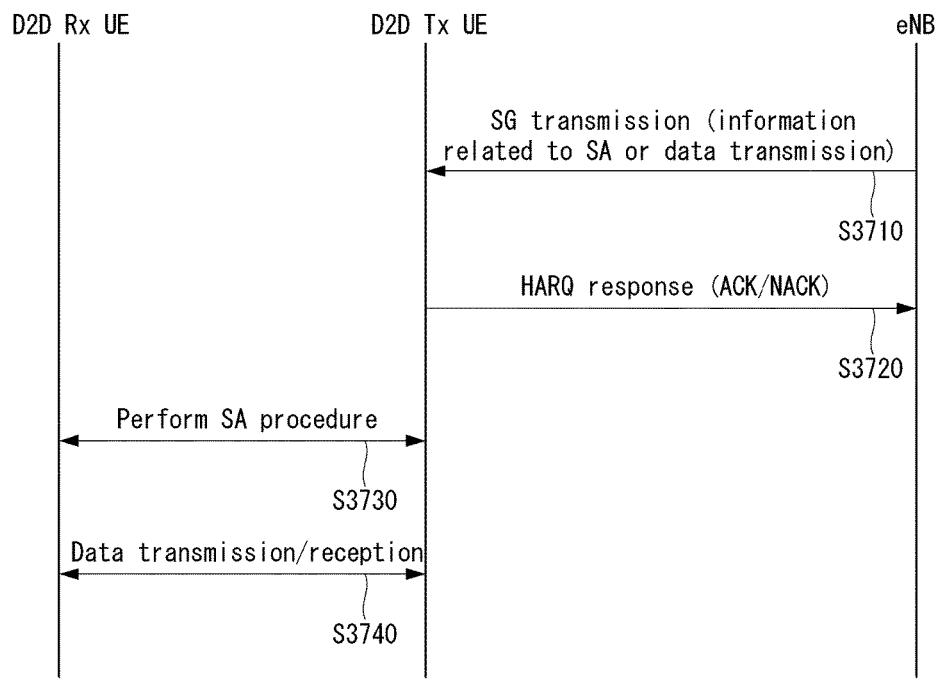

[Figure 38]
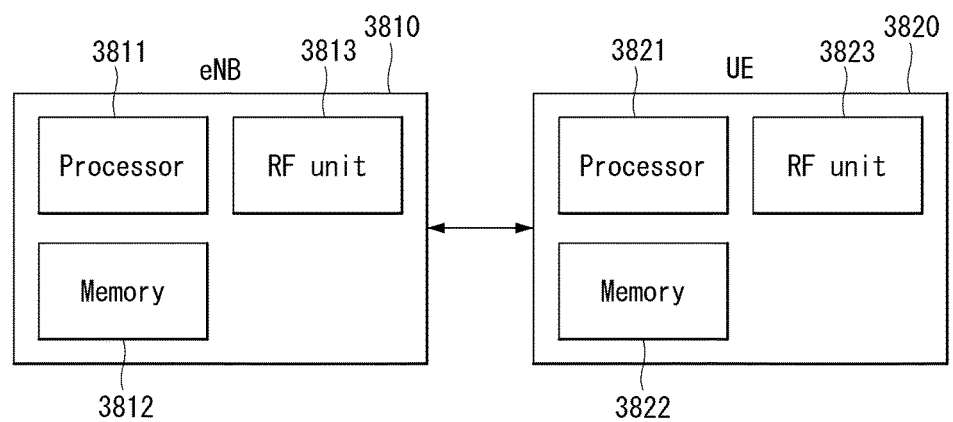

METHOD FOR TRANSMITTING AND RECEIVING SIGNAL IN WIRELESS COMMUNICATION SYSTEM AND DEVICE THEREFOR

This application is a 35 USC § 371 National Stage entry of International Application No. PCT/KR2015/002651 filed on Mar. 19, 2015, and claims priority to U.S. Provisional Application Nos. 61/968,347 filed on Mar. 20, 2014; 61/969,251 filed on Mar. 23, 2014 and 61/969,822 filed on Mar. 24, 2014, all of which are hereby incorporated by reference in their entireties as if fully set forth herein.

TECHNICAL FIELD

The present invention relates to a wireless communication system and, more particularly, to a method and apparatus for transmitting and receiving signals in a wireless communication system supporting device to device communication.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

Direction communication between devices, that is, device-to-device (D2D) communication, refers to a communication method for setting up a direct link between a plurality of devices (e.g., a plurality of types of user equipments (UE) and directly exchanging voice and data between the plurality of devices without the intervention of an evolved NodeB (eNB).

DISCLOSURE

Technical Problem

An embodiment of the present invention is directed to the definition of D2D control information required to demodulate D2D data in performing D2D communication.

Furthermore, an embodiment of the present invention is directed to the provision of a method for transmitting and receiving D2D control information and D2D data.

Furthermore, an embodiment of the present invention is directed to the provision of a method for performing blind decoding on D2D control information in order to reduce power consumption of UE.

Furthermore, an embodiment of the present invention is directed to the definition of the timing relation between the reception of resource allocation information related to a sidelink and transmitted by an eNB and the transmission of resource allocation information related to the transmission and reception of D2D data.

Furthermore, an embodiment of the present invention is directed to the definition of the timing relation between the transmission of resource allocation information related to the transmission and reception of D2D data and the transmission and reception of D2D data.

Technical objects to be achieved in this specification are not limited to the aforementioned objects, and those skilled in the art to which the present invention pertains may evidently understand other technical objects from the following description.

Technical Solution

An embodiment of the present invention provides a method for transmitting and receiving data in a wireless communication system supporting device to device (D2D) communication. The method performed by first User Equipment (UE) includes receiving first control information related to D2D communication from an eNB, transmitting second control information, including resource information related to D2D data transmission, to second UE based on the received first control information, and transmitting the D2D data to the second UE. Receiving the first control information includes allocating, by the eNB, a resource pool related to the D2D communication through high layer signaling.

Furthermore, according to an embodiment of the present invention, receiving the first control information may further include receiving resource information for transmitting the second control information and/or the D2D data in the allocated resource pool from the eNB.

Furthermore, according to an embodiment of the present invention, the resource information for transmitting the second control information and/or the D2D data may be randomly selected from the allocated resource pool.

Furthermore, according to an embodiment of the present invention, the resource pool may include one or more subframe patterns. Each of the subframe patterns may have a bitmap form indicating whether each subframe corresponds to a D2D subframe capable of performing D2D communication.

Furthermore, according to an embodiment of the present invention, the high layer signaling may include Radio Resource Control (RRC) signaling. The resource information for transmitting the second control information and/or the D2D data may be received from the eNB through a physical layer channel.

Furthermore, according to an embodiment of the present invention, the transmission bandwidth of the second control information may be previously determined.

Furthermore, according to an embodiment of the present invention, the first control information may be received in an n-th subframe #n from the eNB. The second control information may be transmitted to the second UE in an (n+4)-th subframe #n+4.

Furthermore, according to an embodiment of the present invention, transmitting the second control information may include generating the second control information based on the received first control information and transmitting the generated second control information to the second UE though an available D2D subframe.

Furthermore, according to an embodiment of the present invention, The method may further include transmitting ACK or NACK for the received first control information to the eNB.

Furthermore, according to an embodiment of the present invention, the method may further include receiving another piece of first control information in an n-th subframe #n from the eNB and discarding the received first control information.

Furthermore, according to an embodiment of the present invention, the method may further include applying another first control information from an (n+k)-th subframe #n+k.

Furthermore, according to an embodiment of the present invention, the method may further include receiving indication information related to a change of the resource information for transmitting the second control information and/or the D2D data.

Furthermore, according to an embodiment of the present invention, the first control information may include a Scheduling Grant (SG) or Downlink Control Information (DCI). The second control information may include Scheduling Assignment (SA) or Sidelink Control Information (SCI).

Furthermore, according to an embodiment of the present invention, the first UE may include D2D transmission UE. The second UE may include D2D reception UE.

Furthermore, an embodiment of the present invention provides first User Equipment (UE) for transmitting and receiving data in a wireless communication system supporting device to device (D2D) communication. The UE includes a Radio Channel (RF) unit configured to transmit and receive radio signals and a processor operatively connected to the RF unit. The processor performs control so that first control information related to D2D communication is received from an eNB, second control information including resource information related to D2D data transmission is transmitted to second UE based on the received first control information, the D2D data is transmitted to the second UE, and a resource pool related to the D2D communication is allocated by the eNB through high layer signaling.

Advantageous Effects

An embodiment of the present invention has an advantage in that D2D communication can be performed by newly defining D2D control information required to demodulate D2D data.

Furthermore, an embodiment of the present invention has an advantage in that power consumption of UE can be reduced because D2D control information and D2D data are separately transmitted and received and blind decoding is applied to only D2D control information.

Furthermore, an embodiment of the present invention has an advantage in that D2D communication can be performed by defining the timing relation between the reception of resource allocation information related to a sidelink and transmitted by an eNB and the transmission of resource allocation information related to the transmission and reception of D2D data.

Furthermore, an embodiment of the present invention has an advantage in that D2D communication can be performed by defining the timing relation between the transmission of resource allocation information related to the transmission and reception of D2D data and the transmission and reception of D2D data.

Advantages which may be obtained in this specification are not limited to the aforementioned advantages, and various other advantages may be evidently understood by those skilled in the art to which the present invention pertains from the following description.

DESCRIPTION OF DRAWINGS

The accompanying drawings, which are included to provide a further understanding of the invention and are incorporated in and constitute a part of this application, illustrate embodiments of the invention and, together with the description, serve to explain the principle of the invention.

FIG. 1 shows the structure of a radio frame in a wireless communication system to which an embodiment of the present invention may be applied.

FIG. 2 is a diagram illustrating a resource grid for a single downlink slot in a wireless communication system to which an embodiment of the present invention may be applied.

FIG. 3 shows the structure of a downlink subframe in a wireless communication system to which an embodiment of the present invention may be applied.

FIG. 4 shows the structure of an uplink subframe in a wireless communication system to which an embodiment of the present invention may be applied.

FIG. 5 shows an example of a form in which PUCCH formats are mapped to the PUCCH region of an uplink physical resource block in a wireless communication system to which an embodiment of the present invention may be applied.

FIG. 6 shows the structure of a CQI channel in the case of a normal CP in a wireless communication system to which an embodiment of the present invention may be applied.

FIG. 7 illustrates an uplink subframe sounding reference signal symbols in a wireless communication system to which an embodiment of the present invention may be applied.

FIG. 8 shows an example of component carriers and carrier aggregations in a wireless communication system to which an embodiment of the present invention may be applied.

FIG. 9 shows an example of the structure of a subframe according to cross-carrier scheduling in a wireless communication system to which an embodiment of the present invention may be applied.

FIG. 10 shows the configuration of a known multiple input/output antenna (MIMO) communication system.

FIG. 11 is a diagram showing channels from a plurality of transmission antennas to a single reception antenna.

FIG. 12 illustrates the segmentation of a relay node resource in a wireless communication system to which an embodiment of the present invention may be applied.

FIG. 13 is a diagram showing an example of reference signals pattern mapped to downlink Resource Bloc (RB) pairs defined in a 3GPP LTE system.

FIG. 14 is a diagram conceptually illustrating D2D communication in a wireless communication system to which an embodiment of the present invention may be applied.

FIG. 15 shows examples of various scenarios for D2D communication to which a method proposed according to an embodiment of the present invention may be applied.

FIG. 16 shows an example in which discovery resources have been allocated according to an embodiment of the present invention.

FIG. 17 is a diagram schematically showing a discovery process according to an embodiment of the present invention.

FIG. 18 is a diagram showing an example of a method for transmitting and receiving D2D control information and D2D data, which is proposed according to an embodiment of the present invention.

FIG. 19 is a diagram showing another example of a method for transmitting and receiving D2D control information and D2D data, which is proposed according to an embodiment of the present invention.

FIG. 20 is a diagram showing yet another example of a method for transmitting and receiving D2D control information and D2D data, which is proposed according to an embodiment of the present invention.

FIG. 21 is a diagram showing an example of a method for configuring D2D control information depending on D2D transmission mode, which is proposed according to an embodiment of the present invention.

FIG. 22 is a diagram showing an example of the timing relation between SG reception and the transmission of SA in D2D UE, which is proposed according to an embodiment of the present invention.

FIG. 23 is a flowchart illustrating an example of the timing relation between SG reception and the transmission of SA in D2D UE, which is proposed according to an embodiment of the present invention.

FIGS. 24 and 25 are diagrams showing examples of the timing relation between SG reception and the transmission of SA in D2D UE, which are proposed according to an embodiment of the present invention.

FIGS. 26 to 28 are diagrams showing examples of the timing relation between D2D SA transmission and D2D data transmission, which are proposed according to an embodiment of the present invention.

FIG. 29 is a flowchart illustrating an example of a method for transmitting and receiving D2D data, which is proposed according to an embodiment of the present invention.

FIGS. 30 to 33 are diagrams showing examples of methods for providing notification of SA resources and/or the locations of D2D data resources, which are proposed according to an embodiment of the present invention.

FIG. 34 is a flowchart illustrating an example of a UE scheduling method for D2D transmission, which is proposed according to an embodiment of the present invention.

FIG. 35 is a diagram showing an example of a UE scheduling method for D2D transmission using RRC signaling, which is proposed according to an embodiment of the present invention.

FIG. 36 is a diagram showing an example of a UE scheduling method for D2D transmission using a physical layer channel, which is proposed according to an embodiment of the present invention.

FIG. 37 is a flowchart illustrating an example of a method for performing an HARQ procedure for an SG, which is proposed according to an embodiment of the present invention.

FIG. 38 is a diagram showing an example of the internal block of a wireless communication apparatus to which methods proposed according to an embodiment of the present invention may be applied.

MODE FOR INVENTION

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA(Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

The uplink control information (UCI) transmitted through the PUCCH may include a scheduling request (SR), HARQ ACK/NACK information, and downlink channel measurement information.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 2 given below.

TABLE 2

| PUCCH Format | Uplink Control Information(UCI) |
| --- | --- |
| Format 1 | Scheduling Request-(SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1-or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK.

In the case of an extended CP, PUCCH format 2 may be transmitted for transmitting the CQI and the HARQ ACK/NACK.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and $0, 1, \ldots, N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixedly mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

PUCCH Channel Structure

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d(0) by a CAZAC sequence r(n) (n=0, 1, 2, ..., N−1) having a length of N becomes y(0), y(1), y(2), ..., y(N−1). y(0), ..., y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

Sounding Reference Signal (SRS)

The SRS is primarily used for the channel quality measurement in order to perform frequency-selective scheduling and is not associated with transmission of the uplink data and/or control information. However, the SRS is not limited thereto and the SRS may be used for various other purposes for supporting improvement of power control and various start-up functions of terminals which have not been scheduled. One example of the start-up function may include an initial modulation and coding scheme (MCS), initial power control for data transmission, timing advance, and frequency semi-selective scheduling. In this case, the frequency semi-selective scheduling means scheduling that selectively allocates the frequency resource to the first slot of the subframe and allocates the frequency resource by pseudo-randomly hopping to another frequency in the second slot.

Further, the SRS may be used for measuring the downlink channel quality on the assumption that the radio channels between the uplink and the downlink are reciprocal. The assumption is valid particularly in the time division duplex in which the uplink and the downlink share the same frequency spectrum and are divided in the time domain.

Subframes of the SRS transmitted by any terminal in the cell may be expressed by a cell-specific broadcasting signal. A 4-bit cell-specific 'srsSubframeConfiguration' parameter represents 15 available subframe arrays in which the SRS may be transmitted through each radio frame. By the arrays, flexibility for adjustment of the SRS overhead is provided according to a deployment scenario.

A 16-th array among them completely turns off a switch of the SRS in the cell and is suitable primarily for a serving cell that serves high-speed terminals.

FIG. 7 illustrates an uplink subframe including a sounding reference signal symbol in the wireless communication system to which the present invention can be applied.

Referring to FIG. 7, the SRS is continuously transmitted through a last SC FDMA symbol on the arrayed subframes. Therefore, the SRS and the DMRS are positioned at different SC-FDMA symbols.

The PUSCH data transmission is not permitted in a specific SC-FDMA symbol for the SRS transmission and consequently, when sounding overhead is highest, that is, even when the SRS symbol is included in all subframes, the sounding overhead does not exceed approximately 7%.

Each SRS symbol is generated by a base sequence (random sequence or a sequence set based on Zadoff-Ch (ZC)) associated with a given time wise and a given frequency band and all terminals in the same cell use the same base sequence. In this case, SRS transmissions from a plurality of terminals in the same cell in the same frequency band and at the same time are orthogonal to each other by different cyclic shifts of the base sequence to be distinguished from each other.

SRS sequences from different cells may be distinguished from each other by allocating different base sequences to respective cells, but orthogonality among different base sequences is not assured.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 8 illustrates examples of a component carrier and carrier aggregation in the wireless communication system to which the present invention can be applied.

FIG. 8a illustrates a single carrier structure used in an LTE system. The component carrier includes the DL CC and the UL CC. One component carrier may have a frequency range of 20 MHz.

FIG. 8b illustrates a carrier aggregation structure used in the LTE system. In the case of FIG. 8b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

FIG. 9 illustrates one example of a subframe structure depending on cross carrier scheduling in the wireless communication system to which the present invention can be applied.

Referring to FIG. 9, a case is illustrated, in which three DL CCs are associated with a DL subframe for an LTE-A terminal and DL CC'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

FIG. 10 is a configuration diagram of a general multiple input multiple output (MIMO) communication system.

Referring to FIG. 10, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epchally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \quad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 13.

First, in respect to a transmission signal, when NT transmitting antennas are provided, since the maximum number of transmittable information is NT, NT may be expressed as a vector given below.

$$s=[s_1,s_2,\ldots,s_{N_T}]^T \qquad \text{[Equation 2]}$$

Meanwhile, transmission power may be different in the respective transmission information s1, s2, ..., sNT and in this case, when the respective transmission power is P1, P2, ..., PNT, the transmission information of which the transmission power is adjusted may be expressed as a vector given below.

$$\hat{s}=[\hat{s}_1,\hat{s}_2,\ldots,\hat{s}_{N_T}]^T=[P_1 s_1, P_2 s_2,\ldots,P_{N_T} s_{N_T}]^T \qquad \text{[Equation 3]}$$

Further, ŝ may be expressed as described below as a diagonal matrix P of the transmission power.

$$\hat{s}= \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, the information vector ŝ of which the transmission power is adjusted is multiplied by a weight matrix W to constitute NT transmission signals x1, x2, ..., xNT which are actually transmitted. Herein, the weight matrix serves to appropriately distribute the transmission information to the respective antennas according to a transmission channel situation, and the like. The transmission signals x1, x2, ..., xNT may be expressed as below by using a vector x.

$$x= \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$
$$= WPs \qquad \text{[Equation 5]}$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, ..., yNR of the respective antennas are expressed as a vector y as described below.

$$y=[y_1,y_2,\ldots,y_{N_R}]^T \qquad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

FIG. 11 is a diagram illustrating a channel from multiple transmitting antennas to one receiving antenna.

As illustrated in FIG. 11, a channel which reaches receiving antenna I from a total of NT transmitting antennas may be expressed as below.

$$h_i^T=[h_{i1},h_{i2},\ldots,h_{iN_T}] \qquad \text{[Equation 7]}$$

Further, all of channels passing through NR receiving antennas from NT transmitting antennas may be shown as below through matrix expression shown in Equation given above.

$$H= \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

Meanwhile, since additive white Gaussian noise (AWGN) is added after passing through a channel matrix H given above in an actual channel, white noises n1, n2, ..., nNR added to NR receiving antennas, respectively are expressed as below.

$$n=[n_1,n_2,\ldots,n_{N_R}]^T \qquad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix}$$

$$= \begin{bmatrix} h_{11} & h_{12} & \ldots & h_{1N_T} \\ h_{21} & h_{22} & \ldots & h_{2N_T} \\ \vdots & & \ddots & \vdots \\ h_{i1} & h_{i2} & \ldots & h_{iN_T} \\ \vdots & & \ddots & \vdots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

[Equation 10]

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R) \quad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Coordinated Multi-Point Transmission and Reception (COMP)

According to a demand of LTE-advanced, CoMP transmission is proposed in order to improve the performance of the system. The CoMP is also called co-MIMO, collaborative MIMO, network MIMO, and the like. It is anticipated that the CoMP will improves the performance of the terminal positioned at a cell edge and improve an average throughput of the cell (sector).

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise. That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

Relay Node (RN)

The relay node transfers data transmitted and received between the base station and the terminal through two different links (a backhaul link and an access link). The base station may include a donor cell. The relay node is wirelessly connected to a wireless access network through the donor cell.

Meanwhile, in respect to the use of a band (spectrum) of the relay node, a case in which the backhaul link operates in the same frequency band as the access link is referred to as 'in-band' and a case in which the backhaul link and the access link operate in different frequency bands is referred to as 'out-band'. In both the cases of the in-band and the out-band, a terminal (hereinafter, referred to as a legacy terminal) that operates according to the existing LTE system (for example, release-8) needs to be able to access the donor cell.

The relay node may be classified into a transparent relay node or a non-transparent relay node according to whether the terminal recognizing the relay node. Transparent means a case in which it may not be recognized whether the terminal communicates with the network through the relay node and non-transparent means a case in which it is recognized whether the terminal communicates with the network through the relay node.

In respect to control of the relay node, the relay node may be divided into a relay node which is constituted as a part of the donor cell or a relay node that autonomously controls the cell.

The relay node which is constituted as a part of the donor cell may have a relay node identity (ID), but does not have a cell identity thereof.

When at least a part of radio resource management (RRM) is controlled by a base station to which the donor cell belongs, even though residual parts of the RRM are positioned at the relay node, the relay node is referred to as the relay node which is constituted as a part of the donor cell. Preferably, the relay node may support the legacy terminal. For example, various types including smart repeaters, decode-and-forward relay nodes, L2 (second layer) relay nodes, and the like and a type-2 relay node correspond to the relay node.

In the case of the relay node that autonomously controls the cell, the relay node controls one or a plurality of cells and unique physical layer cell identities are provided to the respective cells controlled by the relay node. Further, the respective cells controlled by the relay node may use the same RRM mechanism. In terms of the terminal, there is no difference between accessing the cell controlled by the relay node and accessing a cell controlled by a general base station. The cell controlled by the relay node may support the legacy terminal. For example, a self-backhauling relay node, an L3 (third layer) relay node, a type-1 relay node, and a type-1a relay node correspond to the relay node.

The type-1 relay node as the in-band relay node controls a plurality of cells and the plurality of respective cells are recognized as separate cells distinguished from the donor cell in terms of the terminal. Further, the plurality of respective cells may have physical cell IDs (they are defined in the LTE release-8) and the relay node may transmit a synchronization channel, the reference signal, and the like thereof. In the case of a single-cell operation, the terminal may receive scheduling information and an HARQ feedback directly from the relay node and transmit control channels (scheduling request (SR), CQI, ACK/NACK, and the like) thereof to the relay node. Further, the type-1 relay node is shown as a legacy base station (a base station that operates according to the LTE release-8 system) to the legacy terminals (terminal that operate according to the LTE release-8 system). That is, the type-1 relay node has the backward compatibility. Meanwhile, the terminals that operate according to the LTE-A system recognize the type-1 relay node as a base station different from the legacy base station to provide performance improvement.

The type-1a relay node has the same features as the type-1 relay node including operating as the out-band. The operation of the type-1a relay node may be configured so that an influence on an L1 (first layer) operation is minimized or is not present.

The type-2 relay node as the in-band relay node does not have a separate physical cell ID, and as a result, a new cell is not formed. The type-2 relay node is transparent with respect to the legacy terminal and the legacy terminal may not recognize the presence of the type-relay node. The type-2 relay node may transmit the PDSCH, but at least does not transmit the CRS and the PDCCH.

Meanwhile, in order for the relay node to operate as the in-band, some resources in the time-frequency space needs to be reserved for the backhaul link and the resources may be configured not to be used for the access link. This is referred to as resource partitioning.

A general principle in the resource partitioning in the relay node may be described as below. Backhaul downlink and access downlink may be multiplexed in the time division multiplexing scheme on one carrier frequency (that is, only one of the backhaul downlink and the access downlink is activated at a specific time). Similarly, backhaul uplink and access uplink may be multiplexed in the time division multiplexing scheme on one carrier frequency (that is, only one of the backhaul uplink and the access uplink is activated at a specific time).

In the backhaul link multiplexing in the FDD, backhaul downlink transmission may be performed in a downlink frequency band and backhaul uplink transmission may be performed in an uplink frequency band. In the backhaul link multiplexing in the TDD, THE backhaul downlink transmission may be performed in the downlink subframe of the base station and the relay node and the backhaul uplink transmission may be performed in the uplink subframe of the base station and the relay node.

In the case of the in-band relay node, for example, when both backhaul downlink reception from the base station and access downlink transmission to the terminal are performed in the same frequency band, signal interference may occurs at a receiver side of the relay node by a signal transmitted from a transmitter side of the relay node. That is, the signal interference or RF jamming may occur at an RF front-end of the relay node. Similarly, even when both the backhaul uplink transmission to the base station and the access uplink reception from the terminal are performed in the same frequency band, the signal interference may occur.

Therefore, in order for the relay node to simultaneously transmit and receive the signal in the same frequency band, when sufficient separation (for example, the transmitting antenna and the receiving antenna are installed to be significantly geographically spaced apart from each other like installation on the ground and underground) between a received signal and a transmitted signal is not provided, it is difficult to implement the transmission and reception of the signal.

As one scheme for solving a problem of the signal interference, the relay node operates not transmit the signal to the terminal while receiving the signal from the donor cell. That is, a gap is generated in transmission from the relay node to the terminal and the terminal may be configured not to expect any transmission from the relay node during the gap. The gap may be configured to constitute a multicast broadcast single frequency network (MBSFN) subframe.

FIG. 12 illustrates a structure of relay resource partitioning in the wireless communication system to which the present invention can be applied.

In FIG. 12, in the case of a first subframe as a general subframe, a downlink (that is, access downlink) control signal and downlink data are transmitted from the relay node and in the case of a second subframe as the MBSFN subframe, the control signal is transmitted from the relay node from the terminal in the control region of the downlink subframe, but no transmission is performed from the relay node to the terminal in residual regions. Herein, since the legacy terminal expects transmission of the PDCCH in all downlink subframes (in other words, since the relay node needs to support legacy terminals in a region thereof to perform a measurement function by receiving the PDCCH every subframe), the PDCCH needs to be transmitted in all downlink subframes for a correct operation of the legacy terminal. Therefore, even on a subframe (second subframe) configured for downlink (that is, backhaul downlink) transmission from the base station to the relay node, the relay does not receive the backhaul downlink but needs to perform the access downlink transmission in first N (N=1, 2, or 3) OFDM symbol intervals of the subframe. In this regard, since the PDCCH is transmitted from the relay node to the terminal in the control region of the second subframe, the backward compatibility to the legacy terminal, which is served by the relay node may be provided. In residual regions of the second subframe, the relay node may receive transmission from the base station while no transmission is performed from the relay node to the terminal. Therefore, through the resource partitioning scheme, the access downlink transmission and the backhaul downlink reception may not be simultaneously performed in the in-band relay node.

The second subframe using the MBSFN subframe will be described in detail. The control region of the second subframe may be referred to as a relay non-hearing interval. The relay non-hearing interval means an interval in which the relay node does not receive the backhaul downlink signal and transmits the access downlink signal. The interval may be configured by the OFDM length of 1, 2, or 3 as described above. In the relay node non-hearing interval, the relay node may perform the access downlink transmission to the terminal and in the residual regions, the relay node may receive the backhaul downlink from the base station. In this case, since the relay node may not simultaneously perform transmission and reception in the same frequency band, It takes a time for the relay node to switch from a transmission mode to a reception mode. Therefore, in a first partial interval of a backhaul downlink receiving region, a guard time (GT) needs to be set so that the relay node switches to the transmission/reception mode. Similarly, even when the relay node operates to receive the backhaul downlink from the base station and transmit the access downlink to the terminal, the guard time for the reception/transmission mode switching of the relay node may be set. The length of the guard time may be given as a value of the time domain and for example, given as a value of k (k≥1) time samples (Ts) or set to the length of one or more OFDM symbols. Alternatively, when the relay node backhaul downlink subframes are consecutively configured or according to a predetermines subframe timing alignment relationship, a guard time of a last part of the subrrame may not be defined or set. The guard time may be defined only in the frequency domain configured for the backhaul downlink subframe transmission in order to maintain the backward compatibility (when the guard time is set in the access downlink interval, the legacy terminal may not be supported). In the backhaul downlink reception interval other than the guard time, the relay node may receive the PDCCH and the PDSCH from the base station. This may be expressed as a relay (R)-PDCCH and a relay-PDSCH (R-PDSCH) in a meaning of a relay node dedicated physical channel.

Reference Signal (RS)

Downlink Reference Signal

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

When the data is transmitted and received by using the MIMO antenna, a channel state between the transmitting antenna and the receiving antenna need to be detected in order to accurately receive the signal. Therefore, the respective transmitting antennas need to have individual reference signals.

The downlink reference signal includes a common RS (CRS) shared by all terminals in one cell and a dedicated RS (DRS) for a specific terminal. Information for demodulation and channel measurement may be provided by using the reference signals.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 13 illustrates a reference signal pattern mapped to a downlink resource block pair in the wireless communication system to which the present invention can be applied.

Referring to FIG. 13, as a wise in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 13a) and a length of 12 OFDM symbols in the case of an extended cyclic prefix (CP) (FIG. 13b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. Further, the CRS may be used to demodulate the channel quality information (CSI) and data.

The CRS is defined as various formats according to an antenna array at the transmitter side (base station). The 3GPP LTE system (for example, release-8) supports various antenna arrays and a downlink signal transmitting side has three types of antenna arrays of three single transmitting antennas, two transmitting antennas, and four transmitting antennas. When the base station uses the single transmitting antenna, a reference signal for a single antenna port is arrayed. When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

General D2D Communication

Generally, D2D communication is limitatively used as the term for communication between objects or object intelligent communication, but the D2D communication in the present invention may include all communication between various types of devices having a communication function such as a smart phone and a personal computer in addition to simple devices with a communication function.

FIG. 14 is a diagram for schematically describing the D2D communication in a wireless communication system to which the present invention may be applied.

FIG. 14a illustrates a communication scheme based on an existing base station eNB, and the UE1 may transmit the data to the base station on the uplink and the base station may transmit the data to the UE2 on the downlink. The communication scheme may be referred to as an indirect communication scheme through the base station. In the indirect communication scheme, a Un link (referred to as a backhole link as a link between base stations or a link between the base station and the repeater) and/or a Uu link (referred to as an access link as a link between the base station and the UE or a link between the repeater and the UE) which are defined in the existing wireless communication system may be related.

FIG. 14b illustrates a UE-to-UE communication scheme as an example of the D2D communication, and the data exchange between the UEs may be performed without passing through the base station. The communication scheme may be referred to as a direct communication scheme between devices. The D2D direct communication scheme has advantages of reducing latency and using smaller wireless resources as compared with the existing indirect communication scheme through the base station.

FIG. 15 illustrates examples of various scenarios of the D2D communication to which the method proposed in the specification may be applied.

The D2D communication scenario may be divided into (1) an out-of-coverage network, (2) a partial-coverage network, and (3) in-coverage network according to whether the UE1 and the UE2 are positioned in coverage/out-of-coverage.

The in-coverage network may be divided into an in-coverage-single-cell and an in-coverage-multi-cell according to the number of cells corresponding to the coverage of the base station.

FIG. 15a illustrates an example of an out-of-coverage network scenario of the D2D communication.

The out-of-coverage network scenario means perform the D2D communication between the D2D UEs without control of the base station.

In FIG. 15a, only the UE1 and the UE2 are present and the UE1 and the UE2 may directly communicate with each other.

FIG. 15b illustrates an example of a partial-coverage network scenario of the D2D communication.

The partial-coverage network scenario means performing the D2D communication between the D2D UE positioned in the network coverage and the D2D UE positioned out of the network coverage.

In FIG. 15b, it may be illustrated that the D2D UE positioned in the network coverage and the D2D UE positioned out of the network coverage communicate with each other.

FIG. 15c illustrates an example of the in-coverage-single-cell and FIG. 15d illustrates an example of the in-coverage-multi-cell scenario.

The in-coverage network scenario means that the D2D UEs perform the D2D communication through the control of the base station in the network coverage.

In FIG. 15c, the UE1 and the UE2 are positioned in the same network coverage (alternatively, cell) under the control of the base station.

In FIG. 15d, the UE1 and the UE2 are positioned in the network coverage, but positioned in different network coverages. In addition, the UE1 and the UE2 performs the D2D communication under the control of the base station managing the network coverage.

Here, the D2D communication will be described in more detail.

The D2D communication may operate in the scenario illustrated in FIG. 15, but generally operate in the network coverage and out of the network coverage. The link used for the D2D communication (direct communication between the UEs) may be referred to as D2D link, directlink, or sidelink, but for the convenience of description, the link is commonly referred to as the sidelink.

The sidelink transmission may operate in uplink spectrum in the case of the FDD and in the uplink (alternatively, downlink) subframe in the case of the TDD. For multiplexing the sidelink transmission and the uplink transmission, time division multiplexing (TDM) may be used.

The sidelink transmission and the uplink transmission do not simultaneously occur. In the uplink subframe used for the uplink transmission and the sidelink subframe which partially or entirely overlaps with UpPTS, the sidelink transmission does not occur. Alternatively, the transmission and the reception of the sidelink do not simultaneously occur.

A structure of a physical resource used in the sidelink transmission may be used equally to the structure of the uplink physical resource. However, the last symbol of the sidelink subframe is constituted by a guard period and not used in the sidelink transmission.

The sidelink subframe may be constituted by extended CP or normal CP.

The D2D communication may be largely divided into discovery, direct communication, and synchronization.

1) Discovery

The D2D discovery may be applied in the network coverage. (including inter-cell and intra-cell). Displacement of synchronous or asynchronous cells may be considered in the inter-cell coverage. The D2D discovery may be used for various commercial purposes such as advertisement, coupon issue, and finding friends to the UE in the near area.

When the UE 1 has a role of the discovery message transmission, the UE 1 transmits the discovery message and the UE 2 receives the discovery message. The transmission and the reception of the UE 1 and the UE 2 may be reversed. The transmission from the UE 1 may be received by one or more UEs such as UE2.

The discovery message may include a single MAC PDU, and here, the single MAC PDU may include a UE ID and an application ID.

A physical sidelink discovery channel (PSDCH) may be defined as the channel transmitting the discovery message. The structure of the PSDCH channel may reuse the PUSCH structure.

A method of allocating resources for the D2D discovery may use two types Type 1 and Type 2.

In Type 1, eNB may allocate resources for transmitting the discovery message by a non-UE specific method.

In detail, a wireless resource pool for discovery transmission and reception constituted by the plurality of subframes is allocated at a predetermined period, and the discovery transmission UE transmits the next discovery message which randomly selects the specific resource in the wireless resource pool.

The periodical discovery resource pool may be allocated for the discovery signal transmission by a semi-static method. Setting information of the discovery resource pool for the discovery transmission includes a discovery period, the number of subframes which may be used for transmission of the discovery signal in the discovery period (that is, the number of subframes constituted by the wireless resource pool).

In the case of the in-coverage UE, the discovery resource pool for the discovery transmission is set by the eNB and may notified to the UE by using RRC signaling (for example, a system information block (SIB)).

The discovery resource pool allocated for the discovery in one discovery period may be multiplexed to TDM and/or FDM as a time-frequency resource block with the same size, and the time-frequency resource block with the same size may be referred to as a 'discovery resource'.

The discovery resource may be used for transmitting the discovery MAC PDU by one UE. The transmission of the MAC PDU transmitted by one UE may be repeated (for example, repeated four times) contiguously or non-contiguously in the discovery period (that is, the wireless resource pool). The UE randomly selects the first discovery resource in the discovery resource set) which may be used for the repeated transmission of the MAC PDU and other discovery resources may be determined in relation with the first discovery resource. For example, a predetermined pattern is preset and according to a position of the first selected discovery resource, the next discovery resource may be determined according to a predetermined pattern. Further, the UE may randomly select each discovery resource in the discovery resource set which may be used for the repeated transmission of the MAC PDU.

In Type 2, the resource for the discovery message transmission is UE-specifically allocated. Type 2 is sub-divided into Type-2A and Type-2B again. Type-2A is a type in which the UE allocates the resource every transmission instance of the discovery message in the discovery period, and the type 2B is a type in which the resource is allocated by a semi-persistent method.

In the case of Type 2B, RRC_CONNECTED UE request allocation of the resource for transmission of the D2D discovery message to the eNB through the RRC signaling. In addition, the eNB may allocate the resource through the RRC signaling. When the UE is transited to a RRC_IDLE state or the eNB withdraws the resource allocation through the RRC signaling, the UE releases the transmission resource allocated last. As such, in the case of the type 2B, the wireless resource is allocated by the RRC signaling and activation/deactivation of the wireless resource allocated by the PDCCH may be determined.

The wireless resource pool for the discovery message reception is set by the eNB and may notified to the UE by using RRC signaling (for example, a system information block (SIB)).

The discovery message reception UE monitors all of the discovery resource pools of Type 1 and Type 2 for the discovery message reception.

2) Direct Communication

An application area of the D2D direct communication includes in-coverage and out-of-coverage, and edge-of-coverage. The D2D direct communication may be used on the purpose of public safety (PS) and the like.

When the UE 1 has a role of the direct communication data transmission, the UE 1 transmits direct communication data and the UE 2 receives direct communication data. The transmission and the reception of the UE 1 and the UE 2 may be reversed. The direct communication transmission from the UE 1 may be received by one or more UEs such as UE2.

The D2D discovery and the D2D communication are not associated with each other and independently defined. That is, the in groupcast and broadcast direct communication, the D2D discovery is not required. As such, when the D2D discovery and the D2D communication are independently defined, the UEs need to recognize the adjacent UEs. In other words, in the case of the groupcast and broadcast direct communication, it is not required that all of the reception UEs in the group are close to each other.

A physical sidelink shared channel (PSSCH) may be defined as a channel transmitting D2D direct communication data. Further, a physical sidelink control channel (PSCCH) may be defined as a channel transmitting control information (for example, scheduling assignment (SA) for the direct communication data transmission, a transmission format, and the like) for the D2D direct communication. The PSSCH and the PSCCH may reuse the PUSCH structure.

A method of allocating the resource for D2D direct communication may use two modes mode 1 and mode 2.

Mode 1 means a mode of scheduling a resource used for transmitting data or control information for D2D direct communication. Mode 1 is applied to in-coverage.

The eNB sets a resource pool required for D2D direct communication. Here, the resource pool required for D2D direct communication may be divided into a control information pool and a D2D data pool. When the eNB schedules the control information and the D2D data transmission resource in the pool set to the transmission D2D UE by using the PDCCH or the ePDCCH, the transmission D2D UE transmits the control information and the D2D data by using the allocated resource.

The transmission UE requests the transmission resource to the eNB, and the eNB schedules the control information and the resource for transmission of the D2D direct communication data. That is, in the case of mode 1, the transmission UE needs to be in an RRC_CONNECTED state in order to perform the D2D direct communication. The transmission UE transmits the scheduling request to the eNB and a buffer status report (BSR) procedure is performed so that the eNB may determine an amount of resource required by the transmission UE.

The reception UEs monitor the control information pool and may selectively decode the D2D data transmission related with the corresponding control information when decoding the control information related with the reception UEs. The reception UE may not decode the D2D data pool according to the control information decoding result.

Mode 2 means a mode in which the UE arbitrarily selects the specific resource in the resource pool for transmitting the data or the control information for D2D direct communication. In the out-of-coverage and/or the edge-of-coverage, the mode 2 is applied.

In mode 2, the resource pool for transmission of the control information and/or the resource pool for transmission of the D2D direct communication data may be pre-configured or semi-statically set. The UE receives the set resource pool (time and frequency) and selects the resource for the D2D direct communication transmission from the resource pool. That is, the UE may select the resource for the control information transmission from the control information resource pool for transmitting the control information. Further, the UE may select the resource from the data resource pool for the D2D direct communication data transmission.

In D2D broadcast communication, the control information is transmitted by the broadcasting UE. The control information explicitly and/or implicitly indicate the position of the resource for the data reception in associated with the physical channel (that is, the PSSCH) transporting the D2D direct communication data.

3) Synchronization

A D2D synchronization signal (alternatively, a sidelink synchronization signal) may be used so that the UE obtains time-frequency synchronization. Particularly, in the case of the out-of-coverage, since the control of the eNB is impossible, new signal and procedure for synchronization establishment between UEs may be defined.

The UE which periodically transmits the D2D synchronization signal may be referred to as a D2D synchronization source. When the D2D synchronization source is the eNB, the structure of the transmitted D2D synchronization signal may be the same as that of the PSS/SSS. When the D2D synchronization source is not the eNB (for example, the UE or the global navigation satellite system (GNSS)), a structure of the transmitted D2D synchronization signal may be newly defined.

The D2D synchronization signal is periodically transmitted for a period of not less than 40 ms. Each UE may have multiple physical-layer sidelink synchronization identities. The D2D synchronization signal includes a primary D2D synchronization signal (alternatively, a primary sidelink synchronization signal) and a secondary D2D synchronization signal (alternatively, a secondary sidelink synchronization signal).

Before transmitting the D2D synchronization signal, first, the UE may search the D2D synchronization source. In addition, when the D2D synchronization source is searched, the UE may obtain time-frequency synchronization through the D2D synchronization signal received from the searched D2D synchronization source. In addition, the corresponding UE may transmit the D2D synchronization signal.

Hereinafter, for clarity, direct communication between two devices in the D2D communication is exemplified, but the scope of the present invention is not limited thereto, and the same principle described in the present invention may be applied even to the D2D communication between two or more devices.

One of D2D discovery methods includes a method for performing, by all of pieces of UE, discovery using a dispersive method (hereinafter referred to as "dispersive discovery"). The method for performing D2D discovery dispersively means a method for autonomously determining and selecting, by all of pieces of UE, discovery resources dispersively and transmitting and receiving discovery messages, unlike a centralized method for determining resource selection at one place (e.g., an eNB, UE, or a D2D scheduling device).

In the following specification, a signal (or message) periodically transmitted by pieces of UE for D2D discovery may be referred to as a discovery message, a discovery signal, or a beacon. This is collectively referred to as a discovery message, for convenience of description.

In dispersive discovery, dedicated resources may be periodically allocated as resources for transmitting and receiving, by UE, a discovery message separately from cellular resources. This is described below with reference to FIG. 17.

FIG. 16 shows an example of a frame structure to which discovery resources are allocated, to which methods proposed according to embodiments of the present invention may be applied.

Referring to FIG. 16, in the dispersive discovery method, a discovery subframe (i.e., a "discovery resource pool") 1601 for discovery, of all of cellular uplink frequency-time resources, is allocated fixedly (or dedicatedly), and the remaining region may include an existing LTE uplink Wide Area Network (WAN) subframe region 1603. The discovery resource pool may include one or more subframes.

The discovery resource pool may be periodically allocated at a specific time interval (i.e., a "discovery period"). Furthermore, the discovery resource pool may be repeatedly configured within one discovery period.

FIG. 16 shows an example in which a discovery resource pool is allocated in a discovery period of 10 sec and 64 contiguous subframes are allocated to each discovery resource pool. The size of a discovery period and time/frequency resources of a discovery resource pool is not limited thereto.

UE autonomously selects resources (i.e., "discovery resources") for transmitting its own discovery message within a discovery pool dedicatedly allocated thereto and transmits the discovery message through the selected resources. This is described below with reference to FIG. 17.

FIG. 17 is a diagram schematically showing a discovery process to which methods proposed according to embodiments of the present invention may be applied.

Referring to FIGS. 16 and 17, a discovery method basically includes a three-step procedure: a resource sensing step S1701 for discovery message transmission, a resource selection step S1703 for discovery message transmission, and a discovery message transmission and reception step S1705.

First, in the resource sensing step S1701 for discovery message transmission, all of pieces of UE performing D2D discovery receive (i.e., sense) all of discovery messages in a dispersive way (i.e., autonomously) during 1 period of D2D discovery resources (i.e., a discovery resource pool). For example, assuming that an uplink bandwidth is 10 MHz in FIG. 16, all of pieces of UE receive (i.e., sense) all of discovery messages transmitted in N=44 RBs (6 RBs of a total of 50 RBs are used for PUCCH transmission because the entire uplink bandwidth is 10 MHz) during K=64 msec (64 subframes).

Furthermore, in the resource selection step S1703 for discovery message transmission, UE sorts resources having a low energy level from the sensed resources and randomly selects discovery resources within a specific range (e.g., within lower x % (x=a specific integer, 5, 7, 10, . . . )) from the selected resources.

Discovery resources may include one or more resource blocks having the same size and may be multiplexed within a discovery resource pool in a TDM and/or FDM manner.

Furthermore, in the discovery message transmission and reception step S1705, the UE transmits and receives discovery messages based on discovery resources selected after one discovery period (after P=10 seconds in the example of FIG. 16) and transmits and receives discovery messages periodically according to a random resource hopping pattern in a subsequent discovery period.

Such a D2D discovery procedure continues to be performed even in an RRC_IDLE state not having a connection with an eNB in addition to an RRC_CONNECTED state in which the UE has a connection with the eNB.

If such a discovery method is taken into consideration, all of pieces of UE sense all of resources (i.e., discovery resource pools) transmitted by surrounding pieces of UE and randomly select discovery resources within a specific range (e.g., within low x %) from all the sensed resources.

Hereinafter, methods for transmitting D2D control information or D2D data or both, which are proposed according to embodiments of the present invention, are described in detail with reference to FIGS. 18 to 29.

As described above, D2D may be represented as a sidelink.

Furthermore, D2D control information may be represented as Sidelink Control Information (SCI), and the D2D control information may be transmitted and received through a physical sidelink control channel (PSCCH).

Furthermore, D2D data may be transmitted and received through a physical sidelink shared channel (PSSCH), and the transmission/reception of the D2D data may be represented as the transmission and reception of PSSCHs.

In performing D2D communication, D2D control information may be defined in order for D2D UE to demodulate D2D data.

As described above, the D2D control information may be represented as SCI, and the D2D control information and the SCI are interchangeably used hereinafter.

In this case, the D2D control information may be transmitted through a channel (or as a separate signal) separate from a D2D communication channel through which the D2D data is delivered.

As described above, the D2D communication channel may be represented as a PSSCH, and the D2D communication channel and the PSSCH are interchangeably used hereinafter.

Furthermore, methods to be described hereinafter may be identically applied when control information required to deliver a D2D discovery message is separately transmitted.

The D2D control information may include some of or the entire information, such as a New Data Indicator (NDI), Resource Allocation (RA) (or a resource configuration), a Modulation and Coding Scheme/Set (MCS), a Redundancy Version (RV), and a Tx UE ID.

The D2D control information may have a different combination of pieces of information depending on a scenario to which the D2D communication of FIG. 15 is applied.

In general, control information (CI) may be decoded prior to a data channel because it is used to demodulate the data channel.

Accordingly, pieces of UE that receive the control information may need to be aware the location of time and frequency resources through which the control information is transmitted and related parameters for the demodulation of the data channel.

For example, in an LTE (-A) system, in the case of a PDCCH, a UE ID-based hashing function is used by a transmission stage (e.g., an eNB) and a reception stage (e.g., UE) in common so that the UE can be aware that the PDCCH will be transmitted at a specific location of specific symbols of each subframe.

Furthermore, in an LTE (-A) system, in the case of a BCH, an eNB and UE share information, indicating that system information is delivered in a specific symbol of a specific subframe (SF) in a cycle of 40 ms, in advance.

As described above, in order for UE to properly obtain the control information, demodulation-related information (or parameter) of the control information may need to be sufficiently delivered to the UE in advance.

Likewise, in a system supporting D2D communication, in order for D2D UE to successfully demodulate D2D control information, a parameter related to the transmission of the D2D control information may need to be shared by the D2D UE in advance.

The parameter related to the transmission of the D2D control information may include, for example, a subframe/slot index, a symbol index, or an RB index.

Furthermore, the parameter related to the transmission of the D2D control information may be the DCI of a specific format and may be obtained through a PDCCH from an eNB or another D2D UE.

The DCI of the specific format means a newly defined DCI format and may be, for example, a DCI format 5.

In an embodiment, the D2D control information may be designated to be transmitted in all of subframes designated as D2D subframes (i.e., subframes designated for D2D transmission), a series of subframes (a set of subframes or a subframe set) that belong to all the subframes and that has a specific index, or a subframe set having a specific cycle.

Such potential transmission subframe or subframe set of the D2D control information may be recognized by UE in advance through (higher layer) signaling or based on UE-specific information (e.g., a UE ID) in such a manner that the UE may autonomously calculate the transmission subframe or subframe set.

Furthermore, a resource region in which a D2D data channel is delivered and a resource region in which D2D control information is delivered may be differently configured in a time domain.

That is, the D2D control information may be defined to be transmitted in a designated time unit, that is, periodically (or while hopping in a designated time-frequency domain pattern). The D2D data channel may be defined to be delivered only in a resource region indicated by the D2D control information.

Unlike a method for transmitting D2D control information and D2D data together, the method means a method in which a case where the D2D control information is transmitted and a case where D2D data is transmitted are independently operated.

Specifically, if the D2D control information and the D2D data are separately transmitted, (1) parameters (e.g., scrambling, CRC, CRC masking, or demodulation sequence generation parameters) applied to the D2D control information and the D2D data are independently set or (2) a parameter applied to the D2D data is indicated through the D2D control information.

In the case of (2), D2D UE attempts (e.g., explicit or blind decoding) monitoring and decoding at the D2D control information using a potential parameter in a (potential) resource (i.e., subframe or subframe set) in which the D2D control information is reserved to be transmitted and does not perform decoding attempts at the D2D control information in a resource region other than the potential resource.

In this case, there is an advantage in that power consumption of UE can be reduced.

Furthermore, if UE demodulates D2D data, the UE has only to demodulate only designated information at a designated point using a parameter and D2D data resource region information obtained through the D2D control information. Accordingly, there is an advantage in that power consumption of UE can be reduced.

In an embodiment for implementing the aforementioned methods, a method for performing, by pieces of UE, blind search (or decoding) on a specific resource region in order to obtain D2D control information at a specific point of time and decoding D2D control information matched with each of the pieces of UE is described below.

In this case, whether D2D control information is matched with each of the pieces of UE may be implemented based on UE-specific information or UE group-specific (UE group-common) information.

That is, only corresponding UE may perform (blind) decoding on D2D control information by applying UE-specific scrambling or CRC masking to the D2D control information, or all of a plurality of pieces of UE (or a group or all) may decode the D2D control information by applying UE-group common scrambling or CRC masking to the D2D control information.

Accordingly, UE or a UE group may obtain information related to D2D data demodulation from D2D control information that has been successfully decoded.

The D2D control information (or SCI) includes a parameter (in this case, including a parameter obtained through blind search from a given D2D control channel set in addition to a predetermined parameter) used in a D2D control channel (PSCCH) in addition to explicit information included in D2D control information.

The parameter used in the D2D control channel may include scrambling, CRC masking, use resource information, and reference signal related parameters.

Accordingly, UE may not perform blind decoding on D2D data.

In other words, UE or a UE group performs blind decoding on D2D control information through a specific parameter at a specific point of time using its own unique information or based on previously (higher-layer) signaled information in order to obtain the D2D control information.

Through such blind decoding, the UE or UE group may obtain both scheduling information related to data demodulation and various parameters used to generate and transmit a D2D control channel (or control information).

Accordingly, the UE or UE group uses the parameter related to the D2D control channel and the decoded scheduling information to decode and demodulate a D2D data channel.

In this case, the D2D data channel may be represented as a physical sidelink shared channel (PSSCH).

The scheduling information may refer to explicit information, such as resource allocation information, an NDI, an MCS, or a Tx UE ID required to demodulate D2 data.

Furthermore, as described above the scheduling information may be represented as Sidelink Control Information (SCI).

UE is not required to perform parameter blind search, such as that performed on a D2D control channel (or a PSCCH) with respect to a D2D data channel (PSSCH), because it uses a parameter through blind search with respect to the D2D control channel without any change or uses a new parameter generated based on the parameter to generate the D2D data channel.

In another embodiment, a D2D control channel and a D2D data channel may be transmitted in the same subframe (from the standpoint of UE or a UE group) or may be implemented to have different cycles in time.

That is, such a method is a method for performing, by UE, blind decoding on a D2D control channel in a specific subframe and demodulating the D2D data of the same subframe based on corresponding information.

In this case, it is assumed that the UE will not perform blind decoding on the D2D data.

Instead, the UE may perform blind decoding on only the D2D control channel so that blind decoding complexity is dependent on only a D2D control channel in a corresponding subframe.

That is, the UE performs blind decoding on only D2D control information in the corresponding subframe.

If UE has to perform blind decoding on D2D data, when D2D control information and D2D data are transmitted in the same subframe, a problem in that the UE' blind decoding trials suddenly increases may be generated.

In this case, the number of pieces of UE capable of detecting D2D control information through blind decoding in a specific subframe may be limited.

That is, if the transmission periods of D2D control information and D2D data are fixed, there may be a case where the D2D control information and the D2D data are transmitted in the same subframe in some situations depending on their cycles.

In this case, if there is a limit to blind decoding trials in a corresponding subframe, the blind decoding trials of a D2D control information channel or a D2D data channel or both may be reduced.

In order to reduce such a problem, the blind decoding of UE may be introduced only in a D2D control channel so as to prevent a limitation to blind decoding trials attributable to a variation of blind decoding complexity.

Furthermore, there is an advantage that the degree of freedom of scheduling for a D2D data channel may be increased by introducing blind decoding in only a D2D control channel.

That is, although D2D control information and D2D data are placed in the same subframe, if blind decoding is applied to a D2D control channel only, there is no limitation to blind decoding complexity.

Accordingly, although a D2D control channel is periodically transmitted in a specific subframe, a subframe for transmitting a D2D data channel may be determined and allocated even without avoiding a subframe in which the D2D control channel is transmitted.

Assuming that a D2D control channel is detected once and then transmitted in a specific subframe after D2D data associated with the D2D control channel is transmitted, D2D control information does not need to be transmitted again in the transmission opportunity subframe (i.e., a D2D control channel transmission period or PSCCH period) of the D2D control channel during a time interval until a subframe in which the D2D data will be transmitted.

Likewise, from the standpoint of UE, blind decoding (or monitoring) may not be performed on a D2D control channel until a D2D data subframe indicated by D2D control information after blind decoding is performed on the D2D control channel.

In this case, power consumption of the UE can be reduced. This may be differently configured for each piece of UE.

If the period in which a D2D control channel is transmitted (or a PSCCH period) and a subframe offset are differently configured in each of pieces of UE, each of the pieces of UE may be aware of a subframe in which monitoring for D2D control information needs not to be performed.

That is, when each of pieces of UE performs blind decoding on D2D control information in a specific subframe, it may be aware how long it may perform discontinuous reception (DRX) or discontinuous transmission (DTX) by taking into consideration the monitoring subframe period and offset of its own D2D control information.

After receiving and demodulating D2D control information (i.e. scheduling allocation), UE may calculate how long it does not need to monitor D2D control information, that is, it may perform DTX, properly using a specific bit value and D2D control information subframe period (i.e., PDCCH period) information carried on corresponding subframe index, UE ID, or D2D control information.

FIG. 18 is a diagram showing an example of a method for transmitting and receiving D2D control information and D2D data, which is proposed according to an embodiment of the present invention.

In FIG. 18, a C1 1801 is indicative of a resource that belongs to D2D resources allocated to UE 1 (or a UE-group 1) and that is used to transmit D2D control information.

The C1 1801 may be obtained through an (E-)PDCCH, an SIB, "preconfigured", or "relaying by UE."

For example, UE may obtain the C1 (or the SCI format 0) through the DCI format 5 transmitted through a PDCCH.

Furthermore, the period of the C1 corresponds to a period #1.

A C2 1802 is indicative of a resource that belongs to D2D resources allocated to UE 2 (or a UE-group 2) and that is used to transmit D2D control information.

The period of the C2 corresponds to a period #2.

The periods of the C1 and C2 may be represented as a PSCCH period #1 and a PSCCH period #2, respectively.

In FIG. 18, the first C1 information indicates a parameter related to the transmission of D2D data #1 1803 and indicates various types of information (e.g., scheduling information, such as a DM RS sequence, an MCS, and RA) for reception UE in order to demodulate the D2D data #1.

Furthermore, the first C2 information indicates a parameter related to the transmission of D2D data #2 1804 and indicates various types of information (e.g., scheduling information) for reception UE in order to demodulate the D2D data #2.

In FIG. 18, second C1 information 1805 and second C2 information 1086 indicate parameters (e.g., scheduling information) following the first D2D data #1 1803 and the first D2D data #2 1804, that is, parameters associated with second Data #1 and Data #2 1807.

Each of pieces of UE performs blind decoding on D2D control information, corresponding to each of pieces of UE, with respect to a corresponding subframe because it is previously aware of the location of a subframe for D2D control information where the UE may perform monitoring.

FIG. 19 is a diagram showing another example of a method for transmitting and receiving D2D control information and D2D data, which is proposed according to an embodiment of the present invention.

In FIG. 19, UE may be aware that D2D data (D2D data #1) related to a C1 1901 is delivered in a D2D data #1 subframe 1902 by performing blind decoding on the C1 1901.

Furthermore, if the UE is previously aware that there is no C1 in a subframe 1903 periodically reserved (or allocated) for the purpose of transmitting D2D control information after the C1, the UE may skip the reserved subframe 1903 without performing monitoring or blind decoding.

That is, FIG. 19 shows that UE does not perform additional monitoring and blind decoding on D2D control information in a periodically reserved subframe present between the C1 and the data #1.

In this case, it may be considered that the UE performs a DTX operation in a specific subframe in order to reduce power consumption because it may be previously aware that it does not need to perform monitoring and blind decoding on D2D control information in the specific subframe.

FIG. 20 is a diagram showing yet another example of a method for transmitting and receiving D2D control information and D2D data, which is proposed according to an embodiment of the present invention.

In the example of FIG. 19, UE has skipped blind decoding for all of subframes periodically reserved between the C1 and the data #1.

In contrast, FIG. 20 shows a method for skipping, by UE, a reserved D2D control information subframe from a monitoring subframe only when a previously agreed condition is satisfied without skipping blind decoding for all of reserved D2D control information subframes, if a D2D control information subframe reserved to transmit D2D control information is present between the D2D control information and a D2D data subframe indicated by the D2D control information.

From FIG. 20, it may be seen that UE performs blind decoding in a C11 2001 and a C13 2003 and skips blind decoding in a C12 2002.

That is, all of the monitoring subframes C11, C12, and C13 of candidate D2D control information between the C11 2001 and data #11 2004 are not skipped.

For example, the UE performs monitoring on the last subframe C13 2003 of the candidate subframes present between the C11 2001 and the data #11 2004 for blind decoding.

In some embodiments, if N D2D control information candidate subframes are present between a D2D control information (or scheduling information) subframe and a D2D data transmission subframe, blind decoding for K candidate subframes placed at the last portion may be skipped.

In this case, the value "k" may be set depending on a system operation.

In some embodiments, if a D2D control information subframe is divided into a subframe used for D2D transmission and a subframe used for D2D reception (i.e., if two types of subframes are present because they cannot be transmitted and received at the same time due to a half-duplex constraint), the blind decoding skip rule may be applied to only the subframe used for D2D transmission.

If there is no distinction between a subframe used for D2D transmission and a subframe used for D2D reception, the blind decoding skip rule may be applied by taking into consideration both the two types (D2D transmission and D2D reception) of subframes.

In some embodiments, if the valid period of D2D control information is present, assuming that additional D2D control information does not arrive during the valid period, UE may neglect D2D control information that arrives between a D2D control information subframe and a D2D data subframe, that is, may apply the blind decoding skip rule.

Furthermore, assuming that D2D control information subframes are used by a plurality of pieces of UE, each of the pieces of UE may calculate a subframe that belongs to the D2D control information subframes and that may be monitored using its own ID or another parameter, such as a D2D subframe index.

In this case, a method for calculating, by each of pieces of UE, its own D2D control information subframe may be performed like a method for calculating a paging subframe that may be monitored by the UE, that is, calculating the index of a subframe that must be received by the UE after waking up from sleep mode using a UE ID and another parameter.

FIG. 21 is a diagram showing an example of a method for configuring D2D control information depending on D2D transmission mode, which is proposed according to an embodiment of the present invention.

FIG. 21 shows that some of resources allocated using each of two D2D resource allocation methods, that is, two types of transmission mode (transmission mode 1 and transmission mode 2), are configured as common resources if the two D2D resource allocation methods are used.

FIG. 21a shows the resource allocation of D2D control information in an in-coverage scenario, that is, transmission mode 1, and FIG. 21b shows the resource allocation of D2D control information in a partial or out-coverage scenario, that is, transmission mode 2.

The resource of control information in transmission mode 1 is indicated by C1 or C2, and the resource of control information in transmission mode 2 is indicated by P or S.

From FIG. 21, it may be seen that the resources C1 and P have been configured to be aligned in the same time resource or the same frequency resource or both.

That is, FIG. 21 shows that the resources C1 and P have been configured as common resources (e.g., cell-specific or UE group-specific).

In the resource configurations of FIG. 21, if UE changes a resource allocation method, it may use the common resource subframe as a fallback subframe in which a D2D control channel may be monitored.

That is, common resources configured using different resource allocation methods may mean candidate subframes in which UE is obliged to monitor D2D control information when mode of a resource allocation method switches.

Accordingly, pieces of UE to which resources have been allocated according to transmission mode 1 or pieces of UE to which resources have been allocated according to transmission mode 2 may need to perform blind decoding on the resource P or C1 corresponding to common resources.

In this case, pieces of UE within a cell may have different resource allocation methods, that is, different types of transmission mode. Resources may be configured so that one piece of UE has the two types of transmission mode.

Transmission mode 1 and transmission mode 2 do not mean only a resource allocation method for D2D communication, but may be concepts indicative of a resource allocation method for D2D discovery.

That is, from the standpoint of a piece of UE, a D2D discovery resource may be set as transmission mode 1 and a D2D communication resource may be set as transmission mode 2, and vice versa.

From the standpoint of a plurality of pieces of UE, transmission mode 1, transmission mode 2, D2D discovery, and D2D communication combinations may be configured in various ways.

In this case, previously designated UE (e.g., a UE group, all of types of UE within a cell, or all of types of D2D-enabled UE) may be defined to monitor a common resource set by defining the concept of a default resource set or common resource set in transmission mode 1 or transmission mode 2.

Timing relations between a Scheduling Grant (SG) (or DCI), Scheduling Assignment (SA), and D2D data transmission in D2D communication, which are proposed according to an embodiment of the present invention, are described in detail below.

A Scheduling Grant (SG) used hereinafter is indicative of Downlink Control Information (DCI) transmitted from an eNB to D2D UE and may mean a parameter related to D2D communication.

The scheduling grant may be transmitted in a PDCCH/EPDCCH and may be represented as a DCI format 5.

Furthermore, the Scheduling Assignment (SA) may be indicative of D2D control information and may mean control information transmitted and received between pieces of D2D UE, including resource allocation information for the transmission and reception of D2D data.

The Scheduling Assignment (SA) may be transmitted through a PSCCH and may be represented as an SCI format 0.

First, contents related to a method for notifying UE of a resource used for D2D data transmission and a resource used for Scheduling Assignment (SA) transmission for transmitting D2D data transmission-related scheduling information are described with reference to Table 3 below.

Furthermore, a method described with reference to Table 3 is only an embodiment, and D2D data transmission and SA transmission may be performed using methods other than the method of Table 3.

TABLE 3

| Signaling methods | | Resource (or resource pool) indication methods (to be used for the following transmission) | |
|---|---|---|---|
| Resource Allocation | Being transmitted Scenarios | For Scheduling Assignment | For Data communication |
| Mode 1 (eNB schedules) | In-coverage | SIB (or (E)PDCCH) (This may be triggered by a D2D scheduling request (D-SR)) | SIB (or (E)PDCCH) (This may be triggered by a D2D scheduling request (D-SR)) |
|  | Edge-of-coverage | Via other forwarding UE(s) SIB or other sig. forwarding | Via other forwarding UE(s) SIB or other sig. forwarding |
|  | Out-overage | Pre-configured or other | Pre-configured or other |
|  | A semi-static resource pool restricting the available resources for data or control or both may be needed | | |
|  | D2D communication capable UE shall support at least Mode 1 for in-coverage | | |

TABLE 3-continued

| Signaling methods | | Resource (or resource pool) indication methods (to be used for the following transmission) | |
|---|---|---|---|
| Mode 2 (UE selects) | In-coverage | SIB (or (E)PDCCH) | SIB (or (E)PDCCH) |
| | Edge-of-coverage | Via other forwarding UE(s) SIB or other sig. forwarding | Via other forwarding UE(s) SIB or other sig. forwarding |
| | Out-overage | Pre-configured or other | Pre-configured or other |
| | The resource pools for data and control may be the same A semi-static and/or pre-configured resource pool restricting the available resources for data or control or both may be needed D2D communication-capable UE shall support Mode 2 for at least edge-of-coverage and/or out-of-coverage | | |

In Table 3, Mode 1 and Mode 2 in a D2D resource allocation method may be divided as follows.

From a transmitting UE perspective, UE may operate in the two types of mode for resource allocation:

Mode 1: an eNodeB or rel-10 relay node schedules exact resources used by UE to transmit direct data and direct control information Mode 2: UE on its own selects resources from resource pools to transmit direct data and direct control information Referring to Table 3, resource allocation used for SA transmission and D2D data transmission in Mode 1 and Mode 2 may be implemented through an SIB in the case of the in-coverage scenario. That is, an eNB may notify UE of resource allocation for SA transmission and D2D data transmission through an SIB.

In some embodiments, scheduling allocation may be performed and data resources may be allocated using the dynamic control signal (e.g., a PDCCH, an EPDCCH, or a MAC CE) of an eNB.

In some embodiments, resource pools may be previously allocated through an SIB, and UE may be notified of (time-frequency resources) detailed resource allocation information (SA resources and D2D data resources) through a dynamic control signal within the allocated resource range.

In this case, the SA for direct communication may deliver the detailed resource allocation information (e.g., using relative location information or offset information) used in direct data communication.

That is, UE may receive SA and data resource pools through an SIB and may receive detailed SA and data transmission resources through the SA.

If a plurality of resource pools has been previously allocated to UE, SA may be used to indicate one or some of the allocated resource pools.

In Table 3, in the case of the out-coverage scenario, UE may be aware of SA resource pools and data resource pools based on resource configuration information that has been pre-configured or received from coverage UE.

In this case, if the UE has to determine detailed resources for SA transmission and D2D data transmission, it may autonomously select SA resources.

Thereafter, the UE may include resources allocated in relation to D2D data transmission in SA contents and transmit the SA contents to D2D reception UE so that the D2D reception UE is aware of a resource region in which D2D data is received.

In this case, in order to reduce information included in the SA contents, resource region information (e.g., time and frequency index) in which SA has been detected may be used as part of D2D data resource allocation information.

That is, the final resource region is calculated using both the SA resource-related information and the SA contents information.

For example, an SA (transmission) resource-related parameter may be used to obtain only time domain information (e.g., a time domain parameter and a subframe index) of a D2D data resource region, and information delivered in SA may be used to provide notification of frequency domain information (e.g., a frequency domain parameter and an RB index).

In some embodiments, the SA resource-related parameter may be used to designate the absolute locations (e.g., time and frequency indices) of D2D data resources, and resource allocation information included in SA contents may be used to provide notification of the relative locations of D2D data resources.

In some embodiments, the SA (transmission) resource-related parameter may be used to provide notification of a random back-off or transmission probability value.

Furthermore, signaling contents transmitted from an eNB to D2D transmission UE may include a resource configuration, an MCS, etc. for direct scheduling allocation.

The signaling contents may be represented as Downlink Control Information (DCI) or a Scheduling Grant (SG).

The timing relation between an eNB-dynamic control signal and an SA transmission time is described in detail below.

If a D2D resource pool is allocated through a System Information Block (SIB) and UE autonomously determines SA resources and resources for D2D data transmission based on the allocated D2D resource pool, an eNB-dynamic control signal, such as a PDCCH/EPDCCH, may not be required.

In a situation in which all resources are managed by an eNB as in the in-coverage scenario, however, if an eNB controls D2D SA and resource allocation for direct data in real time, the utilization of the resources may become further efficient. In this case, an eNB-dynamic control signal is necessary.

Accordingly, a method using an eNB-dynamic control signal (e.g., a scheduling grant or an MAC CE using DCI) and when D2D transmission UE that has received an eNB-dynamic control signal (i.e., an eNB scheduling grant for SA and/or data for D2D) will transmit SA to D2D reception UE need to be clearly defined.

As described above, an eNB may transmit an SG to D2D UE for (1) scheduling regarding SA transmission and (2) scheduling regarding data transmission.

In this case, the scheduling may mean scheduling related to D2D transmission, and scheduling information may include resource allocation information, an MCS, an RV, and an NDI.

In some embodiments, an eNB may transmit a single SG to D2D UE in order to indicate whether it is scheduling regarding SA transmission or scheduling regarding D2D data transmission.

In this case, an implement may be possible so that an implicit association between SA and data is formed and D2D UE is capable of estimating each of pieces of (SA, data) scheduled information.

For example, D2D UE may receive an SG related to SA transmission from an eNB and check the location or approximate location of D2D data transmission resources having linkage to the SA (or the same is true of scheduling information).

In some embodiments, D2D UE may receive an SG related to data transmission from an eNB and check a resource location and relation information related to SA transmission having linkage to data.

A method 1 to a method 4 below shows timing relations between a dynamic control signal transmitted from an eNB to D2D transmission UE and SA transmitted from D2D transmission UE to D2D reception UE.

That is, the timing relation between the reception of a Scheduling Grant (DCI) from an eNB and the transmission of Scheduling Assignment (SA) or data or both from D2D transmission UE to D2D reception UE is described in detail below with reference to FIGS. 22 to 25 in connection with the method 1 to the method 4.

Method 1

FIG. 22 is a diagram showing an example of the timing relation between SG reception and SA transmission in D2D UE, which is proposed according to an embodiment of the present invention.

FIG. 22 shows an example in which if a D2D Scheduling Assignment (SA) subframe (SF) has been periodically configured, when D2D transmission UE receives a Scheduling Grant (SG) from an eNB in a D2D SA SF period (or a PSCCH period) 2201 at step S2210, the D2D transmission UE transmits scheduling allocation in a D2D SA SF 2202 that first arrives after the received SG SF at step S2220.

Method 2

FIG. 23 is a flowchart illustrating an example of the timing relation between SG reception and SA transmission in D2D UE, which is proposed according to an embodiment of the present invention.

FIG. 23 shows a method for transmitting, by D2D transmission UE, SA to D2D reception UE by taking into consideration the processing time of UE (or a system) after receiving an SG from an eNB.

That is, the D2D transmission UE receives SG from the eNB, configures an SA based on the received SG, and transmits the SA to the D2D reception UE by taking into consideration the time taken to transmit the SA, that is, processing delay.

In this case, if the processing delay is taken into consideration, the SA transmission of the D2D transmission UE may be performed in a fourth subframe #n+4 after an SG subframe (subframe #n) received from the eNB.

That is, when D2D transmission UE receives an SG in a subframe #n at step S2301, it may transmit SA to D2D reception UE in a fourth subframe #n+4 2301 at step S2302.

In this case, if the fourth subframe #n+4 2301 is not a D2D SA subframe, the D2D transmission UE may transmit the SG in a D2D SA subframe 2302 that first arrives after the fourth subframe #n+4.

In contrast, if the D2D transmission UE receives the SG from the eNB in the subframe #n and a D2D SA SF that first arrives subsequently is present in the fourth subframe #n+4, the D2D transmission UE determines that the D2D SA SF is not valid or available.

Accordingly, the D2D transmission UE transmits the D2D SA in a subsequent (or next period) available D2D SA SF.

The n+4 is an embodiment and may be generalized as "n+k", that is, D2D SA is transmitted in a k-th SA SF after the SG is received.

The value "k" may be configured by taking into consideration the development of the future technology, performance of UE and so on.

Furthermore, the value "k" may be differently configured for each piece of UE depending on the capability of the UE.

FIG. 23a shows an example of a method for transmitting SA in a subframe #n+k, and FIG. 23b shows an example of a method for transmitting SA in an SA SF that is first reaches after a subframe #n+k.

In relation to the configuration of the value "k", it is different from an LTE (-A) system in that resources are not explicitly allocated, but a D2D resource pool is determined. In this case, resources are selected and transmitted, and different values are configured between pieces of UE if a collision between resources is permitted.

The method of FIG. 23 may be identically applied to D2D data transmission.

That is, when D2D UE receives control information (or scheduling information) related to D2D data transmission from an eNB in a subframe n, the D2D UE may transmit D2D data in a subframe n+k' by taking into consideration the processing time of the D2D UE.

The control information related to the D2D data transmission may be an SG or SA related to the resource allocation of the D2D data transmission.

The k' value may be configured differently from a value "k" at an SA transmission time point.

In general, a k'> (or =) k relation may be established by taking into consideration a probability that D2D data transmission may occur a bit later.

Method 3 An operation when SA SFs are configured as a group, that is, a plurality of SFs is allocated for SA and operated, is described below.

FIG. 24 is a diagram showing another example of the timing relation between SG reception and SA transmission in D2D UE, which are proposed according to an embodiment of the present invention.

FIG. 24 shows a method for transmitting, by D2D transmission UE, SA to D2D reception UE in the first SA SF after a subframe n+4 when it receives an SG (or resource allocation DCI) from an eNB in a subframe SF #n.

In this case, if the first SA SF after the subframe n+4 is a group of M contiguous SA SFs, when the D2D transmission UE receives the SG in the subframe SF #n at step S2410, it transmits the SA in the SA SF group that is first met after the subframe n+4 at step S2430.

What the SA will be transmitted in which one of the M SFs of the SA SF group may be finally aware through the SG at step S2420.

Furthermore, if an SA or data transmission subframe (SF) includes a plurality of subframes, a specific bit (or specific field) of a DCI format may be used to determine the location of the SA or data transmission subframe.

For example, a bit to determine the DCI formats 0/1, a hopping bit, or some of or all of RA bits may be used to determine the location of the SA or data transmission subframe.

Furthermore, the SG may be divided for SA and data purposes and may be further divided for special purposes, if necessary.

Accordingly, a bit to determine the DCI formats 0/1, a hopping bit, or some of or all of RA bits may be used to divide the purposes of an SG.

Method 4

A method for providing notification of the location of an SA SF through Radio Resource Control (RRC) is described below.

FIG. 25 is a diagram showing yet another example of the timing relation between SG reception and SA transmission in D2D UE, which is proposed according to an embodiment of the present invention.

FIG. 25 shows a method of previously providing notification of the location of an SA SF through RRC at step S2510 and simply using an SG (e.g., PDCCH DCI) as an activation purpose in which the SA SF may be used at step S2520.

In this case, a special index may be defined so that an association between RRC signaling and activation DCI may be checked.

That is, DCI indicative of the activation of an SA SF may be defined to denote the RRC of which index.

DCI, that is, an SG, accurately indicates the activation of an SA SF or SF set transmitted through RRC. In this case, an RRC set including a series of indices mapped to the DCI may be previously designated.

Furthermore, D2D transmission UE transmits SA to D2D reception UE through the SA SF whose activation has been indicated by the SG at step S2530.

A method for providing notification of the time location of SA resources or D2D data resources or both through the RRC signaling of FIG. 25 is described in detail later with reference to FIGS. 30 to 33.

The timing relation between SA transmission and D2D data transmission in D2D UE, which is proposed according to an embodiment of the present invention, is described in detail below with reference to FIGS. 26 to 28.

FIG. 26 is a diagram showing an example of the timing relation between D2D SA transmission and D2D data transmission, which is proposed according to an embodiment of the present invention.

Regarding the timing between a D2D SA SF and a D2D data SF, D2D data may be implicitly transmitted and received according to a predetermined rule.

FIG. 26 shows a method for transmitting, by D2D transmission UE, SA to D2D reception UE in a subframe #n at step S2610 and transmitting D2D data to the D2D reception UE in an available D2D data SF 2601 that first arrives after a subframe "n+k" at step S2620, as in the timing relation between SG transmission and SA transmission shown in FIG. 23.

Likewise, the value "k" is configurable and a different value "k" may be configured for each piece of UE.

Furthermore, as in the timing relation between SG transmission and SA transmission shown in FIG. 24, UE may be notified of an available D2D data SF group, and a specific SF (e.g., a subframe #m) within the D2D data SF group may be separately indicated.

In this case, a parameter "k" indicative of the specific SF may be included in SA contents.

The value "k" of the indication parameter may be differently interpreted depending on the following conditions.

That is, the value "k" of the indication parameter may be differently interpreted depending on each pieces of UE, the location of a resource region, a UE group or the scenario (i.e., in-coverage, out-coverage, and edge-of-coverage) or both.

FIG. 27 is a diagram showing another example of the timing relation between D2D SA transmission and D2D data transmission, which are proposed according to an embodiment of the present invention.

Unlike in the method of FIG. 26, FIG. 27 shows a method for transmitting a D2D data SF within "n+k" (2701) at step S2720 when a D2D SA SF is determined (a subframe #n) at step S2710.

In this case, although D2D data is transmitted in a subframe right after the D2D SA SF, there is no problem if UE is previously notified of such a fact.

In this case, D2D reception UE may decode the D2D data by preparing data SF buffering received subsequently along with SA SF buffering by taking into consideration the processing time (or processing latency).

In this case, the value "k" is configurable and may be differently configured for each piece of UE.

FIG. 28 is a diagram showing yet another example of the timing relation between D2D SA transmission and D2D data transmission, which is proposed according to an embodiment of the present invention.

That is, FIG. 28 shows a method for directly indicating a D2D data SF explicitly through SA.

Assuming that D2D reception UE receives SA in a subframe #n at step S2810, D2D transmission UE may calculate a value "k" based on some of SA contents or an SA transmission resource parameter and explicitly notify the D2D reception UE of the calculated value "k" in a subframe #n+k in which D2D data is received at step S2820.

A method for transmitting D2D data related to the valid period of SA contents is described below.

SA contents may indicate an MCS value, whether frequency hopping has been applied, and SA information to or in which resource allocation related to frequency hopping has been applied or configured in a resource region for SA transmission.

FIG. 29 is a flowchart illustrating an example of a method for transmitting and receiving D2D data, which is proposed according to an embodiment of the present invention.

In the method of FIG. 29, if a D2D SA SF is periodically configured, it is assumed that D2D data between SA SF transmission periods is transmitted using the same SA value.

In this case, D2D reception UE that receives D2D data may receive a plurality of D2D data through the SA value once received from D2D transmission UE.

That is, the D2D reception UE may determine that the same one SA value is applied to multiple data subframes.

Referring to FIG. 29, the D2D reception UE receives SA from the D2D transmission UE through a periodically configured SA subframe at step S2910.

The D2D reception UE receives at least one D2D data from the D2D transmission UE using the received SA for a specific time interval at step S2920.

The specific time interval may be an SA period or SA contents valid time interval in which the SA has been received.

The SA contents valid time interval may be previously determined, may be simply defined as an SF index, or may be defined as a multiple of an SA SF period.

Furthermore, the SA contents valid time interval may be defined as a combination of an SA SF and a normal SF or may be defined as a D2D data SF period or a multiple of the D2D data SF period.

In this case, the SF may mean a normal SF index or a D2D SF index.

In this case, if a plurality of D2D data is present for the specific time interval, the SA includes resource allocation information related to the plurality of D2D data.

That is, the D2D reception UE may receive a plurality of D2D data based on the SA received at step S2910 even without additionally receiving SA for the specific time interval.

In another embodiment, D2D control information may be separated from control information transmitted through SA and control information embedded (or included) in D2D data and transmitted.

That is, (1) control information, such as RA or an MCS, and (2) control information, such as an NDI, may be separated through direct SA and direct data, respectively, based on the attributes of the control information and transmitted.

FIGS. 30 to 33 are diagrams showing examples of methods for providing notification of the locations of SA resources or D2D data resources or both, which are proposed according to embodiments of the present invention.

FIGS. 30 and 31 show methods for transmitting and receiving SA or D2D data or both using a subframe pattern in which SA resources or D2D data resources or both may be transmitted and received.

A subframe pattern in which the SA resources or the D2D data resources or both may be transmitted and received may be represented as a Resource Pattern for Transmission (RPT).

The RPT means time resources or frequency resources or both for guaranteeing a plurality of transmission opportunities for D2D data Transport Blocks (TBs).

Accordingly, the RPT may be divided into a Time-RPT (T-RPT) and a Frequency RPT (F-RPT).

Specifically, FIG. 30 shows a method for explicitly notifying D2D UE of a subframe pattern related to SA resources or D2D data resources or both. FIG. 31 shows a method for implicitly transmitting a subframe pattern related to SA resources or D2D data resources or both to D2D UE.

UE uses some of all of UL subframes as D2D subframes.

That is, the UE performs communication with an eNB in the remaining UL subframes other than the D2D subframes.

Accordingly, eNB-to-UE transmission and the transmission of D2D Tx UE-D2D Rx UE are not generated at the same time.

If UE transmits a D2D signal to another UE in a D2D subframe, it may not receive a D2D signal from another UE in the same band of the D2D subframe. The reason for this is that the D2D signal transmitted by the UE is greatly subjected to strong interference when the UE receives a D2D signal from another UE.

In order to solve such a problem, a subframe pattern (or configuration) between a D2D transmission subframe in which a D2D signal is transmitted and a D2D reception subframe in which a D2D signal is received may be differently configured.

Furthermore, in order to solve an interference problem attributable to the transmission and reception of D2D signals by one UE and to reduce interference between two pieces of adjacent UE by reducing a probability that the two pieces of UE use redundant time resources at the same time, the patterns of subframes in which the two pieces of UE transmit D2D signals may be differently configured.

Specifically, an eNB can solve an interference problem which may be generated between pieces of UE by configuring a subframe pattern to be used for D2D transmission by each of the pieces of UE by taking into consideration the distance between the pieces of UE (by checking the degree of mutual interference).

In this case, the eNB explicitly notifies D2D UE of D2D transmission subframe patterns 3010 through high layer signaling, such as RRC signaling.

In this case, the eNB may dynamically configure the D2D transmission subframe pattern in the D2D UE through an EPDCCH or a PDCCH. That is, if a D2D transmission subframe pattern is transmitted to D2D UE through an EPDCCH or PDCCH, there is an advantage in that the D2D transmission subframe pattern can be configured by rapidly handling a change of the location of UE.

According to another method, in order to reduce a signaling burden of an eNB, the eNB may not determine a D2D (transmission) subframe pattern and notify UE of the D2D (transmission) subframe, but the UE may autonomously select a required D2D (transmission) subframe pattern.

That is, such a method is a method for implicitly obtaining, by D2D UE, a D2D subframe pattern.

In this case, the D2D UE may select the D2D subframe pattern using a similar random method based on its own UE ID (or a UE-specific parameter having a similar characteristic).

In some embodiments, D2D UE may receive minimum signaling information from an eNB and select a subframe pattern using a similar random method using the minimum signaling information as a factor for determining a similar random value.

If such an implicit subframe pattern selection method is used, the aforementioned interference between pieces of UE can be reduced because proper subframe patterns (or subframe sets) are given and a subframe pattern is randomly selected from the proper subframe patterns (or subframe sets).

As shown in FIG. 30, an eNB may deliver the candidate group 3010 of subframe patterns related to D2D transmission, which may be potentially used by specific UE, through high layer signaling, such as RRC signaling, and transmit (or designate) one or more subframe patterns 3020 to be actually used for D2D transmission at a specific point of time through an Enhanced PDCCH (EPDCCH) or a PDCCH.

Specifically, the eNB transmits previously defined N subframe patterns, that is, a candidate group of N subframe patterns (e.g., a subframe pattern #0, a subframe pattern #1, a subframe pattern #2, . . . ,), to D2D UE through high layer signaling, such as RRC signaling.

Thereafter, the eNB specifies one or more of the N subframe patterns 3010 as a D2D transmission subframe pattern 3020 and transmits the D2D transmission subframe pattern 3020 to the D2D UE through a PDCCH or an EPDCCH.

In this case, in the process for transmitting the previously defined N subframe patterns to the D2D UE, the eNB may assign that the actual pattern of the subframe pattern #k (k=0, 1, 2, . . . ,) has what form in the bitmap form of a subframe which is repeated in a specific cycle, for example, an SF pattern #0 (10001010) or an SF pattern #1 (00111001).

Furthermore, as shown in FIG. 31, the eNB may transmit the candidate group 3010 of subframe patterns related to D2D transmission, which may be potentially used, to specific UE through high layer signaling, such as RRC signaling. D2D UE that has received the candidate group 3010 may select the subframe pattern 3120 to be used for actual transmission at a specific point of time using a UE identification parameter (e.g., a UE ID 3110).

In this case, the UE identification parameter (or seed) 3110 may be previously allocated by the eNB.

Thereafter, the D2D UE may perform D2D transmission and reception through the selected subframe pattern.

FIGS. 32 and 33 are diagrams showing examples of methods for changing a subframe pattern related to SA resources or D2D data resources or both, which are proposed according to embodiments of the present invention.

FIG. 32 shows a method for explicitly providing notification of a changed subframe pattern, and FIG. 33 shows a method for implicitly providing notification of a changed subframe pattern.

FIGS. 32 and 33 show operations for changing, by D2D UE, a subframe pattern allocated thereto using the methods of FIGS. 30 and 31.

FIGS. 32 and 33 show a subframe pattern repeated in a cycle of 8 ms (i.e., 8 subframes). An eNB may previously transmit a subframe pattern #0{10001010} 3210 and a subframe pattern #1{00111001} 3210 to D2D UE through high layer signaling.

In this case, the value "1" is a subframe related to D2D transmission, and it means that a signal related to D2D transmission may be transmitted and received in a corresponding subframe.

Furthermore, the value "0" is a subframe not related to D2D transmission, and this means that a signal related to D2D transmission may not be transmitted and received in a corresponding subframe.

The meanings of the value "0" and the value "1" may be reversed.

Thereafter, the eNB designates a D2D subframe pattern (e.g., an SF pattern #0 3220) that will be actually used by D2D UE through a PDCCH. The D2D UE operates based on the designated D2D subframe pattern.

Thereafter, the eNB transmits D2D subframe pattern change information 3230, providing notification of a changed D2D subframe pattern, to the D2D UE through a PDCCH (or another piece of control information or another message or RRC signaling) if the D2D subframe pattern has been changed.

The D2D subframe pattern change information may designate a changed subframe pattern using some fields within a PDCCH or EPDCCH.

If existing DCI for an UL grant is reused for DCI for D2D, it may be used as subframe pattern change information to designate a changed subframe pattern using a field that belongs to DCI fields and that is not used.

The field that belongs to the DCI fields and that is not used may include an indicator to determine the DCI formats 0/1A, a CQI request field, and an NDI field.

Some of a DM RS cyclic shift field or MCS/RV field using a plurality of bits may be used.

If resources for SA transmission and resources for D2D data transmission are designated to UE through a single PDCCH or EPDCCH at the same time, a subframe pattern for the SA and a subframe pattern for the D2D data may be allocated to respective states designated by the fields within the DCI.

In the method of FIG. 33, D2D UE may randomly select a D2D subframe pattern (e.g., an SF pattern #0 3320) that belongs to the candidate group of D2D subframe patterns and that will be actually used using a UE ID and operate based on the selected D2D subframe pattern.

In this case, an eNB may transmit a D2D subframe pattern (change) indicator, indicating that a D2D subframe pattern has been changed, to the D2D UE through a PDCCH (or another piece of control information or another message or RRC signaling).

In this case, the D2D UE may randomly reselect a D2D subframe pattern (e.g., an SF pattern #1 3330) using a pseudo-random selection parameter (seed, a D2D UE identification parameter) using a UE ID.

In this case, the eNB may previously notify the D2D UE of the UE ID through RRC signaling.

That is, if the D2D UE selects or reselects a subframe pattern using a similar random method, the eNB may previously deliver a parameter or seed value for determining a similar random value to the D2D UE.

Furthermore, the D2D UE may determine the index of a D2D transmission subframe using a similar random value without a pattern.

In this case, the eNB may deliver a parameter or seed value to determine the similar random value to the D2D UE.

Furthermore, the D2D UE may determine a subframe pattern or the index of a subframe based on only signaling information for determining such a similar random value. A unique value of the D2D UE may be included in the signaling information, and the subframe pattern or the index of the subframe may be determined.

By way of example, a method for obtaining, by D2D reception UE, the transmission bandwidth of SA in order to detect the SA transmitted by D2D transmission UE is described below.

In this case, the transmission bandwidth of the SA may be previously fixed so that the D2D reception UE is aware of the transmission bandwidth of the SA.

In this case, a portion that belongs to a resource allocation field included in an SG and that corresponds to the number of allocated RBs may be fixed as a predetermined value, such as "0", or may be defined as the previously fixed transmission bandwidth of SA.

A field (or bits) included in the SG related to the transmission bandwidth of the SA may be used for other purposes (e.g., for the purpose of designating the location of an actual SA SF within an SA SF group) in addition to the transmission bandwidth of SA.

The UE scheduling of eNB-to-D2D transmission (Tx) (and/or D2D reception (Rx)) for D2D transmission is described below with reference to FIGS. 34 to 37.

FIG. 34 is a flowchart illustrating an example of a UE scheduling method for D2D transmission, which is proposed according to an embodiment of the present invention.

First, the eNB performs a Scheduling Grant (SG) procedure along with D2D transmission (Tx) UE or D2D reception (Rx) UE (Step#1, S3410).

That is, the eNB transmits an SG related to D2D transmission to the D2D Tx UE or the D2D Rx UE.

The SG procedure (Step#1) may be basically divided into the following two methods.

(1) The first method Method#1 is a method for allocating D2D transmission-related resources through RRC signaling and then dynamically controlling a detailed operation, such as the activation/release of the allocated resource, through a physical/MAC control channel (e.g., a PDCCH).

(2) The second method Method#2 is a method for controlling a D2D operation by transmitting resource allocation related to D2D transmission or scheduling information related to D2D transmission or both through a physical/MAC control channel.

In the methods (1) and (2), the D2D UE may receive scheduling information (e.g., an MCS, an RV, or a DM RS parameter) related to D2D communication from the eNB and determine D2D transmission-related resources based on the scheduling information, or the D2D UE may autonomously determine a D2D transmission-related resource.

Resource allocation information may be included in the scheduling information, and the scheduling information and the resource allocation information may be separately interpreted.

If the D2D UE receives scheduling information related to D2D transmission from the eNB according to the method (1), it may receive the scheduling information through an RRC signal or a control channel, such as a PDCCH, or both.

In this case, if the D2D UE receives the scheduling information from the eNB through RRC signaling, the DCI format of the PDCCH may not include fields, such as an MCS, RV, and DM RS parameter related to D2D transmission.

Accordingly, if fields related to D2D transmission are defined to be included in the DCI format of a PDCCH, a total length of the DCI format may be reduced by obviating the unnecessary fields or a DCI format may become a DCI format having the same length by applying a technology, such as zero padding and transmitted.

Likewise, if the D2D UE directly determines scheduling information, such as an MCS or an RV, contents fields related to scheduling information, such as an MCS and an RV, are not required in a PDCCH transmitted in the method (1) or (2).

Accordingly, a method for obviating the unnecessary fields or applying the zero padding may be adopted.

The method (1) is described in more detail later with reference to FIG. 35, and the method (2) is described in more detail later with reference to FIG. 36.

Thereafter, the D2D transmission UE performs a scheduling procedure related to D2D data transmission for the transmission and reception of D2D data along with the D2D reception UE (Step#2, S3420). That is, the D2D transmission UE performs an SA transmission procedure.

Step#2 may be used along with the methods used in Step#1.

In this case, pieces of information which may be included in SA may be as follows. In particular, pieces of information related to resources for D2D data reception may be included in the SA.

Scheduling information (including resource allocation information) related to SA transmission may be construed as being transmitted from the eNB to the D2D transmission UE (through an SG). The SA transmission may be construed as being transmitted from the D2D transmission UE to the D2D reception UE.

Information related to resources for data reception: information related to resources for D2D data reception RB allocation: RB allocation information Number and pattern of retransmissions: information about the number and pattern of retransmissions Frequency hopping pattern: information about a frequency hopping pattern SPS (including periodicity) of data: information about the periodicity of data Target ID: ID information of D2D reception UE MCS/RV of data Timing advance of data A method for receiving, by D2D transmission UE, an SG from an eNB and determining a point of time at which the D2D transmission (Tx) UE transmits SA to D2D reception (Rx) UE is described below.

The received SG may include scheduling information (including resource allocation information) related to the SA.

First, it is assumed that the eNB is aware of a D2D transmission subframe in which the D2D transmission UE may transmit the SA.

The eNB transmits the SG to the D2D transmission UE in an n−k1 (k1 is an integer) subframe of an SA transmission subframe(n), so the D2D transmission UE may transmit the SA to the D2D reception UE.

The value "k1" may be about 4 when the receive processing capability of UE is taken into consideration in an LTE (-A) system.

The value "k1" may be 2 or 3 according to the evolution of the technology.

The D2D transmission UE that has received the SG may also check the location of a D2D data transmission subframe through the received SG.

That is, the SG may be used for SA scheduling and also for a point of time (subframe) at which D2D data is transmitted and frequency resource allocation, which involve D2D data transmission.

A method for receiving, by D2D transmission UE, an SG from an eNB and transmitting SA to D2D reception UE in a SA transmission-valid resource after a specific time is described below.

The received SG may include scheduling information related to SA transmission.

The eNB transmits the SG to the D2D transmission UE based on a point of time at which D2D transmission resources were requested from the D2D transmission UE without checking an SA transmission valid subframe in detail.

That is, when the D2D transmission UE receives the SG from the eNB, it generates SA based on the received SG.

Thereafter, the D2D transmission UE checks an SA-available subframe in which the generated SA may be transmitted and transmits the generated SA to the D2D reception UE in an available or valid D2D subframe (i.e., a subframe valid from an SA transmission viewpoint).

In this case, the D2D transmission UE receives the SG from the eNB, but may not immediately transmit the SA to the D2D reception UE although a next subframe is available.

The reason for this is that time corresponding to "n+k2" is required in order for the D2D transmission UE to receive the SG, perform reception processing, generates SA using the SG, that is, information related to the received SA, and prepare D2D data transmission.

In this case, k2 has an integer value. The value "k2" may be 2 or 3 according to the evolution of the technology. That is, the value "k2" may have various values, such as 1, 2, 3, or 4 depending on the reception capability of UE.

If k2=4, the D2D transmission UE receives an SG from the eNB and transmits SA to the D2D reception UE after 4 subframes.

If there is no available subframe for the SA transmission right after the 4 subframes, the D2D transmission UE transmits the SA to the D2D reception UE in a next subframe.

If a next available subframe is not present, the D2D transmission UE may transmit the SA to the D2D reception UE in a next subframe.

That is, it may be interpreted that the SA is transmitted in the earliest SA-available subframe of subframes subsequent to a subframe n+4.

In this case, all of subframes not designated as D2D transmission may correspond to a subframe in which SA transmission is impossible.

In some embodiments, a subframe in which a synchronization signal is transmitted, such as subframes 0 and 5, may be excluded from the SA-available subframe.

In some embodiments, a subframe in which a paging subframe is transmitted, such as subframes 0, 4, 5, and 9, may also be excluded from the SA-available subframe.

In this case, although a specific D2D subframe (e.g., a WAN synchronization signal and a channel similar to a BCH) has been designated as a D2D subframe, if a channel for delivering D2D-essential information is determined in a specific D2D subframe, the specific D2D subframe may be excluded from the SA-available subframe.

In some embodiments, a dedicated subframe for SA transmission may have been configured, and SA may be transmitted only in such an SA-dedicated subframe.

That is, the D2D transmission UE receives the SG from the eNB (in a subframe n) and may transmit the SA to the D2D reception UE in an SA (transmission)-available subframe after n+k3 subframes.

In this case, the D2D UE which has received the SG may also check the location of a data transmission subframe. That is, the SG may also be used for a point of time (subframe) at which data is transmitted and frequency resource allocation, involving data transmission, in addition to SA scheduling.

Thereafter, the D2D transmission UE transmits D2D data to the D2D reception UE based on the SA (Step#3, S3430).

In this case, the D2D transmission UE may transmit required control information along with the D2D data.

The control information may be transmitted in a piggyback form along with the D2D data.

The validity of SG is described below.

If D2D UE receives an SG1 from an eNB and then receives an SG2 from the eNB, the D2D UE may determine that the received SG1 is no longer valid.

A point of time at which the validity of SG is determined may be applied after an n+k4 subframe since a subsequent transmitted SG, that is, since the SG2 is received (in a subframe n).

In this case, the value "k4" is an integer. If a point of time at which the SG2 may be applied is taken into consideration, the value "k4" may have a value of 2, 3, or 4.

Furthermore, the eNB may transmit the SG1 and the SG2 to the D2D UE at the same time.

In this case, the SG1 and the SG2 may be merged into a single DCI format and transmitted.

If separate channel coding is performed on each of the SG2 and SG2, a probability that the D2D UE may successfully receive each SG may be increased.

As described above, the D2D UE may feed the results of the reception of each SG back to the eNB and use a PUCCH as a channel for feeding the results of the reception of each SG back.

Furthermore, control of transmission power of the D2D UE may be implemented through the SG.

In this case, the eNB may control transmission power of the D2D UE by transmitting a TPC command to the D2D UE using a TPC field or the DCI formats 3/3A.

If the DCI formats 3/3A are used, the eNB may reserve a specific field of a corresponding format for D2D power control and use the correspond format.

This may be previously partitioned that it is for D2D power control or for LTE (-A) power control through RRC signaling.

Furthermore, a valid time when the SG is available may be determined.

That is, after a lapse of a specific time (or a specific number of subframes) or after a specific number of D2D subframes since the D2D UE receives the SG from the eNB, the D2D UE may automatically discard the received SG.

In some embodiments, an SG timer may be newly defined. When the SG timer expires, an SG may be considered to be invalid.

In some embodiments, a previous SG may be defined to be valid until the D2D UE receives a next SG.

In some embodiments, after receiving an SG, the D2D UE discards the received SG after a specific time or a specific number of subframes. If another SG has been previously received from the eNB, the D2D UE may discard the previously received SG although a specific time elapses.

FIG. 35 is a diagram showing an example of a UE scheduling method for D2D transmission using RRC signaling, which is proposed according to an embodiment of the present invention.

That is, FIG. 35 shows a detailed method of step S3410 in FIG. 34.

Steps S3520 and S3530 of FIG. 35 are the same as steps S3420 and S3430 of FIG. 34, and thus only differences between them are described below.

First, an eNB performs a Scheduling Grant (SG) procedure along with D2D Tx UE or D2D Rx UE (Step#1, S3510).

As described above with reference to FIG. 34, step S3510 may be implemented through two methods.

(1) The first method Method#1 is a method for allocating D2D transmission-related resources through RRC signaling and additionally controlling a detailed dynamic operation for the allocated resources, such as activation/release, through a physical/MAC control channel (e.g., a PDCCH).

(2) The second method Method#2 is a method for controlling a D2D operation by transmitting resource allocation and/or scheduling information related to D2D transmission through a physical/MAC control channel.

The method Method#1 of (1), that is, scheduling (e.g., semi-static scheduling) for SA (and data) based on an RRC signal and a dynamic control signal (e.g., an (E)PDCCH or a PHICH), is described in more detail below.

The method (1) may be divided into 1) RRC signaling transmission for overall resource configuration/allocation for SA (and/or data) transmission S3511 and 2) a dynamic control information transmission (S3512) method for the activation/release of SA (and data) resources allocated through 1).

First, RRC signaling transmission is described.

RRC Signaling: Overall Resource Configuration/Allocation for SA (and Data)

As in an LTE Semi-Persistent Scheduling (SPS) scheduling method, an eNB allocates a specific resource region (or a specific resource set/group) related to D2D transmission to D2D UE through RRC signaling.

Furthermore, the eNB may allocate a monitoring resource for D2D reception to the D2D UE in a similar way.

The specific resource region may be a subframe(s) or a set of resource blocks.

Accordingly, the D2D UE may perform blind demodulation (or blind decoding) on D2D data or SA by monitoring the specific resource region.

The monitoring resource may mean a resource that provides notification of monitoring so that the D2D UE performs blind decoding on SA or D2D data (Tx-to-Rx for D2D) or both.

The meaning of "A and/or B" used in an embodiment of the present invention may be construed as having the same concept including at least one (A, B, and A&B) of A and B.

The method (1) may be used to provide notification of a data resource region, that is, for D2D data scheduling in addition to SA scheduling.

That is, the method (1) means an operation for allocating resources related to D2D transmission through RRC and dynamically activating or releasing the resources using a physical layer and an MAC layer control channel, like Semi-Persistent Scheduling (SPS).

For more detailed contents of the operation, reference may be made to FIGS. 30 to 33.

Thereafter, steps S3520 and S3530 are performed.

FIG. 36 is a diagram showing an example of a UE scheduling method for D2D transmission using a physical layer channel, which is proposed according to an embodiment of the present invention.

That is, FIG. 36 shows a detailed method of step S3410 in FIG. 34.

Steps S3620 and S3630 of FIG. 36 are the same as steps S3420 and S3430 of FIG. 34, and thus only differences between them are described below.

First, an eNB performs a scheduling grant procedure along with D2D Tx UE or D2D Rx UE (Step#1, S3610).

Likewise, Step#1 may be implemented through two methods.

(1) The first method Method#1 is a method for allocating D2D transmission-related resources through RRC signaling and additionally controlling a detailed dynamic operation for the allocated resources, such as activation/release, through a physical/MAC control channel (e.g., a PDCCH).

(2) The second method Method#2 is a method for controlling a D2D operation by transmitting resource allocation and/or scheduling information related to D2D transmission through a physical/MAC control channel.

The meaning of "A and/or B" used in an embodiment of the present invention may be construed as having the same concept including at least one of A and B.

The method (2), that is, an (Enhanced) PDCCH transmission method based on dynamic scheduling, is described below with reference to FIG. 36.

The method (2) refers to a method for notifying the D2D Tx UE (or the D2D Rx UE or both) of an MCS, an RV, an NDI, power control and/or a PMI for D2D data demodulation in addition to resource allocation using a channel (e.g., an EPDCCH, PDCCH, PHICH, or new channel) for delivering control information in a physical layer (or including an MAC layer) instead of transmitting scheduling information (including resource allocation) related to D2D transmission through RRC (S3611).

The resource allocation, MCS, RV, NDI, power control, or PMI may be called scheduling information related to D2D transmission.

Furthermore, the use of SG may be variously defined in addition to the aforementioned uses.

For example, the SG may be used to provide notification that the contents of scheduling information related to D2D transmission have been changed.

The meaning of the change includes a modification, deletion, and addition.

In this case, there are a case where the same signaling format as that of the SG is used and a case where a signaling format different from that of the SG is used.

Scheduling information included in the SG may mean a change of a D2D transmission-related resource region in which RC signaling has been designated, a change of resources that need to be used by the D2D Tx UE (or the D2D Rx UE or both) in a corresponding resource region, a change of a resource region substantially allocated by the SG, a change of a resource region group, or a change of some of or all of SA contents.

The SA contents include a variety of types of scheduling information in addition to RA. The D2D Tx UE (or the D2D Rx UE or both) is notified of a change of the contents of one or more of the variety of types of scheduling information, including the RA, through the SG.

The eNB may generate a new SG of a compact type by reducing the bit field of the SG and use the new SG.

Furthermore, as in resource reallocation related to D2D transmission, a method for implementing SG/SA updates includes using a PHICH in addition to a PDCCH and an EPDCCH.

That is, the eNB may use PHICH resources to notify the D2D UE whether there is a change of an SG/SA.

The D2D UE may monitor a PHICH including information indicative of a change of an SG/SA and receive the changed SG/SA.

The D2D UE receives a modified SG/SA after a time previously designated by the eNB or in a previously designated time interval through an SG/SA modification notification.

In this case, the modification notification may have two meanings.

The first meaning is that the D2D UE is notified that SA will be changed and the D2D UE needs to receive the changed SA by monitoring an SG in order to be aware of the changed SA.

The second meaning is that the D2D UE is notified that an SG has been changed or will be changed at a specific predetermined point of time and thus the D2D UE needs to receive the SG that has been changed or will be changed.

As described above, the SG may be used for data scheduling in addition to SA scheduling.

Thereafter, steps S3620 and S3630 are performed.

FIG. 37 is a flowchart illustrating an example of a method for performing an HARQ procedure for an SG, which is proposed according to an embodiment of the present invention.

Steps of S3710, S3730, and S3740 of FIG. 37 are the same as steps S3410 to S3430 of FIG. 34, and thus only differences between them are described below.

After step S3710, D2D UE and an eNB performs an SG Hybrid Automatic Retransmission reQuest (HARQ) procedure at step S3720.

That is, the D2D UE may transmit a response to a received SG to the eNB between a point of time at which the D2D UE receives the SG from the eNB and a point of time at which the D2D UE transmits SA to another D2D UE. The response may be ACK or NACK.

As described above, the SG may be control information or resource allocation information related to the SA or the D2D data transmission or both, as in the activation/deactivation of allocated resources in SPS.

The control information or resource allocation information related to the SA or the D2D data transmission or both may be indicated as scheduling information related to D2D transmission.

The SG HARQ procedure in step S3720 can prevent the deterioration of performance or the generation of a situation in which communication is impossible, which is generated because the D2D UE does not transmit SA to another D2D UE or does not apply a change of SA contents that have already been transmitted and thus continues to transmit the SA prior to the change if the D2D UE does not receive the SG from the eNB.

Accordingly, there is a need for confirmation regarding whether an SG has been received. In this case, an UL ACK/NACK mechanism may be used.

That is, the D2D UE may transmit a response (i.e., ACK or NACK) to the SG to the eNB using an existing PUCCH structure or in an existing embedded PUCCH to PUSCH form (i.e., in an UCI piggyback form).

In this case, if the SG complies with a mechanism, such as a PDCCH or EPDCCH format, a response to the SG may be easily used using a PUCCH resource connected to each DCI index of the PDCCH or EPDCCH.

In this case, if information included in the SG is separated into information for SA scheduling and information for D2D data scheduling and received by the D2D UE, the D2D UE may feed a response regarding whether each SG has been received back.

Furthermore, since the response to the SG may have a maximum of four types, the size of the response may be represented as 1 bit to 2 bits.

In this case, the response to the SG may be fed back through a PUCCH.

General Apparatus to which an Embodiment of the Present Invention May be Applied FIG. 38 is a diagram showing an example of the internal block of a wireless communication apparatus to which methods proposed according to an embodiment of the present invention may be applied.

Referring to FIG. 38, the wireless communication system includes an eNB 3810 and a plurality of pieces of UE 3820 placed in the region of the eNB 3810.

The eNB 3810 includes a processor 3811, memory 3812, and a Radio Frequency (RF) unit 3813. The processor 3811 implements the proposed functions, processes and/or methods proposed with reference to FIGS. 1 to 37. The layers of a radio interface protocol may be implemented by the processor 3811. The memory 3812 is connected to the processor 3811, and stores various pieces of information for driving the processor 3811. The RF unit 3813 is connected to the processor 3811, and transmits and/or receives radio signals.

The UE 3820 includes a processor 3821, memory 3822, and an RF unit 3823. The processor 3821 implements the proposed functions, processes and/or methods proposed with reference to FIGS. 1 to 37. The layers of a radio interface protocol may be implemented by the processor 3821. The memory 3822 is connected to the processor 3821, and stores various pieces of information for driving the processor 3821. The RF unit 3823 is connected to the processor 3821, and transmits and/or receives radio signals.

The memory 3812, 3822 may be placed inside or outside the processor 3811, 3821 and connected to the processor 3811, 3821 by various well-known means. Furthermore, the eNB 3810 or the UE 3820 or both may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as not to be combined with other elements or characteristics. Furthermore, some of the elements and/or the characteristics may be combined to form an embodiment of the present invention. Order of operations described in connection with the embodiments of the present invention may be changed. Some of the elements or characteristics of an embodiment may be included in another embodiment or may be replaced with corresponding elements or characteristics of another embodiment. It is evident that in the claims, one or more embodiments may be constructed by combining claims not having an explicit citation relation or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and or microprocessors or all of them.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Examples in which a method for transmitting a discovery message in a wireless communication system according to an embodiment of the present invention has been applied to a 3GPP LTE/LTE-A system have been described, but the method may be applied to various wireless communication systems in addition to the 3GPP LTE/LTE-A system.

The invention claimed is:

1. A method for performing, by a first terminal, device-to-device (D2D) communication in a wireless communication system, the method comprising:

receiving a higher layer signal, including resource pool information related to the D2D communication, from a base station;

receiving first control information related to the D2D communication from the base station;

generating second control information based on the received first control information, wherein the second control information is used for scheduling D2D data for a second terminal;

transmitting the generated second control information to the second terminal; and transmitting the D2D data to the second terminal, wherein the resource pool information comprises first resource information related to the second control information transmission and second resource information related to the D2D data transmission, wherein the first control information is received in a subframe #n from the base station, wherein the first control information is considered to be control information configured in a first available D2D subframe which starts at least four subframes after the subframe #n, and when a resource for another second control information transmission is scheduled, between a resource for the second control information transmission and a resource for the D2D data transmission, a blind decoding for the scheduled resource is skipped.

2. The method of claim 1, wherein the first control information comprises:
time resource information related to the D2D data transmission, and
indication information indicating activation or deactivation of SPS (Semi-Persistent-Scheduling) related to a specific D2D resource included in the resource pool information.

3. The method of claim 1, further comprising:
discarding the first control information after a specific number of subframes.

4. The method of claim 1, wherein the first terminal is a D2D transmission terminal, and the second terminal is a D2D reception terminal.

5. A first terminal for performing device-to-device (D2D) communication in a wireless communication system, the first terminal comprising:
a transmitter and a receiver; and
a processor, operatively connected to the transmitter and the receiver, wherein the processor is configured to:
control the receiver to receive a higher layer signal including resource pool information related to the D2D communication from a base station;
control the receiver to receive first control information related to the D2D communication from the base station;
generate second control information based on the received first control information,
wherein the second control information is used for scheduling D2D data for a second terminal;
control the transmitter to transmit the generated second control information to the second terminal; and
control the transmitter to transmit the D2D data to the second terminal,
wherein the resource pool information comprises first resource information related to the second control information transmission and second resource information related to the D2D data transmission,
wherein the first control information is received in a subframe #n from the base station,
wherein the first control information is considered to be control information configured in a first available D2D subframe which starts at least four subframes after the subframe #n, and
when a resource for another second control information transmission is scheduled, between a resource for the second control information transmission and a resource for the D2D data transmission, a blind decoding for the scheduled resource is skipped.

6. The first terminal of claim 5, wherein the first control information comprises:
time resource information related to the D2D data transmission, and
indication information indicating activation or deactivation of SPS (Semi-Persistent-Scheduling) related to a specific D2D resource included in the resource pool information.

* * * * *